(12) United States Patent
Hughes et al.

(10) Patent No.: US 12,379,108 B2
(45) Date of Patent: *Aug. 5, 2025

(54) METHOD OF OPERATING GAS TURBINE COMBUSTOR WITH MULTIPLE FUEL STAGES

(71) Applicant: GE Infrastructure Technology LLC, Greenville, SC (US)

(72) Inventors: Michael John Hughes, State College, PA (US); Bradley Donald Crawley, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,572

(22) Filed: Dec. 31, 2023

(65) Prior Publication Data

US 2024/0230096 A1    Jul. 11, 2024

Related U.S. Application Data

(60) Provisional application No. 63/437,640, filed on Jan. 6, 2023.

(51) Int. Cl.
| | |
|---|---|
| *F23R 3/34* | (2006.01) |
| *F02C 9/26* | (2006.01) |
| *F23R 3/28* | (2006.01) |

(52) U.S. Cl.
CPC ............ *F23R 3/34* (2013.01); *F02C 9/263* (2013.01); *F23R 3/286* (2013.01); *F23R 3/346* (2013.01)

(58) Field of Classification Search
CPC .. F23R 3/34; F23R 3/346; F23R 3/286; F02C 9/263
See application file for complete search history.

(56) References Cited

U.S. PATENT DOCUMENTS

| 4,112,676 A | 9/1978 | DeCorso | |
|---|---|---|---|
| 4,288,980 A * | 9/1981 | Ernst | F23R 3/36 60/39.23 |

(Continued)

FOREIGN PATENT DOCUMENTS

| EP | 2865981 B1 | 4/2015 |
|---|---|---|
| EP | 3406974 A1 | 11/2018 |

(Continued)

OTHER PUBLICATIONS

PCT ISR & Opinion PCT/US2024/010235 on May 3, 2024.

(Continued)

*Primary Examiner* — William H Rodriguez
(74) *Attorney, Agent, or Firm* — Dority & Manning, P.A.

(57) ABSTRACT

A method of operating a gas turbine combustor includes: selectively directing fuel and a first air supply through a fuel nozzle assembly in a head end section to produce a first fuel/air mixture, which is ignited within a liner to produce combustion gases; selectively directing a second fuel/air mixture through the liner from at least one first injector disposed at a first axial location; selectively directing a third fuel/air mixture through the liner from at least one second injector disposed at a downstream, second axial location. Each of the fuel nozzle assembly, the first injector(s), and the second injector(s) receives only a respective air supply from a compressor discharge plenum. The second injector(s) receive a respective air supply that is greater than each of the respective air supplies of the fuel nozzle assembly and the first injector(s).

18 Claims, 16 Drawing Sheets

(56) References Cited

U.S. PATENT DOCUMENTS

| | | | |
|---|---|---|---|
| 5,289,686 | A | 3/1994 | Razdan et al. |
| 6,253,555 | B1* | 7/2001 | Willis ............... F23R 3/346 |
| | | | 60/737 |
| 7,137,256 | B1 | 11/2006 | Stuttaford et al. |
| 8,112,216 | B2 | 2/2012 | Davis, Jr. et al. |
| 9,130,198 | B2 | 9/2015 | Visco et al. |
| 9,752,835 | B2 | 9/2017 | Waldman et al. |
| 9,764,435 | B2 | 9/2017 | Morris et al. |
| 9,808,864 | B2 | 11/2017 | Kawada et al. |
| 9,945,562 | B2 | 4/2018 | Hughes et al. |
| 10,254,499 | B1 | 4/2019 | Cohen et al. |
| 10,563,869 | B2 | 2/2020 | Berry et al. |
| 10,718,523 | B2* | 7/2020 | Gubba ............... F23D 14/64 |
| 10,744,561 | B2 | 8/2020 | Yoshimura |
| 2003/0051478 | A1 | 3/2003 | Matsuyama et al. |
| 2008/0245072 | A1 | 10/2008 | Maeding |
| 2009/0071157 | A1 | 3/2009 | Cai |
| 2010/0170219 | A1* | 7/2010 | Venkataraman ........ F23R 3/346 |
| | | | 60/39.463 |
| 2010/0174466 | A1 | 7/2010 | Davis, Jr. et al. |
| 2013/0122438 | A1 | 5/2013 | Stoia et al. |
| 2013/0299602 | A1 | 11/2013 | Hughes et al. |
| 2013/0318977 | A1 | 12/2013 | Berry et al. |
| 2014/0013756 | A1 | 1/2014 | Melton et al. |
| 2014/0061327 | A1 | 3/2014 | Hughes |
| 2014/0109591 | A1 | 4/2014 | Bothien et al. |
| 2014/0174090 | A1 | 6/2014 | Chen et al. |
| 2014/0260262 | A1* | 9/2014 | Davis, Jr. ............... F23R 3/20 |
| | | | 60/734 |
| 2014/0260269 | A1* | 9/2014 | Davis, Jr. ............... F23R 3/28 |
| | | | 60/737 |
| 2014/0260270 | A1 | 9/2014 | Graham et al. |
| 2014/0260303 | A1* | 9/2014 | Davis, Jr. ............... F23R 3/346 |
| | | | 60/776 |
| 2014/0338355 | A1 | 11/2014 | Stewart et al. |
| 2015/0027126 | A1* | 1/2015 | Berry ............... F02C 7/222 |
| | | | 60/739 |
| 2015/0219338 | A1 | 8/2015 | Dai et al. |
| 2016/0033133 | A1* | 2/2016 | Johnson ............... F23R 3/286 |
| | | | 60/737 |
| 2016/0081469 | A1 | 3/2016 | Undesser |
| 2016/0123596 | A1 | 5/2016 | Hoke et al. |
| 2016/0361873 | A1 | 12/2016 | Maier |
| 2017/0176014 | A1* | 6/2017 | Hughes ............... F02C 3/04 |
| 2018/0066847 | A1 | 3/2018 | Stoia et al. |
| 2018/0087776 | A1* | 3/2018 | Flanagan ............... F23R 3/346 |
| 2018/0112875 | A1 | 4/2018 | Daniel |
| 2018/0156128 | A1 | 6/2018 | Imfeld et al. |
| 2018/0172273 | A1 | 6/2018 | Purcell et al. |
| 2018/0187603 | A1 | 7/2018 | Berry |
| 2018/0328587 | A1* | 11/2018 | Gubba ............... F23R 3/346 |
| 2018/0363551 | A1* | 12/2018 | Chila ............... F02C 7/222 |
| 2018/0363906 | A1* | 12/2018 | Bailey ............... F23R 3/04 |
| 2019/0056112 | A1 | 2/2019 | Natarajan et al. |
| 2021/0199299 | A1 | 7/2021 | Berry et al. |
| 2021/0301722 | A1 | 9/2021 | Ziminsky et al. |
| 2021/0301736 | A1* | 9/2021 | Natarajan ............... F23R 3/16 |
| 2022/0026069 | A1* | 1/2022 | Paniharam ............... F02C 7/228 |
| 2023/0022725 | A1 | 1/2023 | Fukuba et al. |
| 2023/0104922 | A1* | 4/2023 | Berry ............... F28F 13/12 |
| | | | 60/730 |
| 2023/0135396 | A1 | 5/2023 | Kalb et al. |
| 2024/0060644 | A1 | 2/2024 | Hellat et al. |
| 2024/0230090 | A1* | 7/2024 | Hughes ............... F02C 7/22 |
| 2024/0230093 | A1* | 7/2024 | Hughes ............... F23R 3/16 |
| 2024/0230094 | A1* | 7/2024 | Hughes ............... F23R 3/002 |
| 2024/0230095 | A1* | 7/2024 | Hughes ............... F23R 3/346 |
| 2024/0230097 | A1* | 7/2024 | Hughes ............... F23R 3/283 |
| 2024/0230098 | A1* | 7/2024 | Berry ............... F23R 3/346 |

FOREIGN PATENT DOCUMENTS

| | | |
|---|---|---|
| JP | 5841649 B1 | 1/2016 |
| KR | 20150074155 A | 7/2015 |

OTHER PUBLICATIONS

Co-Pending U.S. Appl. No. 18/401,568, filed Dec. 31, 2023.
Co-Pending U.S. Appl. No. 18/401,579, filed Dec. 31, 2023.
Co-Pending U.S. Appl. No. 18/401,576, filed Dec. 31, 2023.
Co-Pending U.S. Appl. No. 18/401,588, filed Dec. 31, 2023.
Co-Pending U.S. Appl. No. 18/401,584, filed Dec. 31, 2023.
Co-Pending U.S. Appl. No. 18/401,585, filed Dec. 31, 2023.

* cited by examiner

— FIG. 15 —

METHOD OF OPERATING GAS TURBINE COMBUSTOR WITH MULTIPLE FUEL STAGES

TECHNICAL FIELD

The present disclosure relates generally to gas turbine combustors and, more particularly, to a combustor having multiple axial stages of fuel injection and a method of operating such a combustor.

BACKGROUND

A gas turbine engine (such as is used for electrical power generation) generally includes a compressor section, a combustion section having one or more combustors, and a turbine section. The compressor section progressively increases the pressure of the working fluid to supply a compressed working fluid to the combustion section. The compressed working fluid is routed through one or more fuel nozzles that extend axially within a forward, or head, end of the combustor. A fuel is combined with the flow of the compressed working fluid to form a combustible mixture. The combustible mixture is burned within a combustion chamber to generate combustion gases having a high temperature, pressure, and velocity. The combustion chamber is defined by one or more liners or ducts that define a hot gas path through which the combustion gases are conveyed into the turbine section. In a can-annular type combustion system, multiple combustion cans (each having its own fuel nozzles and liner) produce combustion gases that drive the turbine section.

The combustion gases expand as they flow through the turbine section to produce work. For example, expansion of the combustion gases in the turbine section may rotate a shaft connected to a generator to produce electricity. The turbine may also drive the compressor or another mechanical load (e.g., a generator or a propeller) by means of a common shaft or rotor.

In recent years, manufacturers of large gas turbine engines have expended considerable efforts to develop combustion systems that produce low emissions (e.g., NOx emissions), often using fuel nozzles commonly referred to as "micro mixers," "advanced premixers," or "bundled tube fuel nozzles." Located in the head end of the combustor, each such fuel nozzle includes a group of premixing tubes that are arranged within a housing and that extend through a common fuel plenum defined by the housing. Each premixing tube has one or more fuel injection holes in fluid communication with the fuel plenum. Air enters from the upstream ends of the tubes and mixes with fuel from the fuel injection holes within the tubes, such that a fuel/air mixture exits through the outlet ends of the tubes into the combustion chamber. The flames produced by bundled tube fuel nozzles are characteristically short.

Designing a robust bundled tube fuel nozzle having dozens of premixing tubes has presented challenges. Some designs include multiple components of different materials, thereby increasing product cost and complexity. Various approaches have been taken to secure the tubes and associated housing components within bundled tube fuel nozzles, to join the bundled tube fuel nozzles to fuel delivery conduits, to ensure sufficient mixing time, to adequately cool the hot surfaces, and to minimize dynamics. Thus, for a single combustor having many (e.g., five or six) bundled tube fuel nozzles, hundreds of braze joints and multiple sealing locations are employed. These numbers are multiplied many times over for a gas turbine engine having from six to eighteen combustors.

Additional efforts to reduce emissions and to improve turndown of the gas turbine engine have led to the development of axial fuel staging ("AFS") systems (sometimes referred to as "distributed combustion systems"), which include injectors that are placed downstream of the head end and that introduce a fuel/air mixture as a cross flow into the combustion gases produced by the head end fuel nozzles. The area in which the axial fuel staging injectors deliver the fuel/air mixture is often referred to as a "secondary combustion zone," which is downstream of the "primary combustion zone" supplied by the head end fuel nozzles. The ability to control multiple fuel delivery locations (e.g., head end and downstream injectors) provides the gas turbine operator with greater flexibility to turn-down (i.e., reduce) the power output of the gas turbine engine, as well as spreading out the heat release, which can reduce dynamics.

In H-class combustion systems having both bundled tube fuel nozzles and axial fuel staging injectors, the air flowing to the bundled tube fuel nozzles is first used to cool the combustion liner. That is, the air from the compressor discharge case is directed through impingement holes in a flow sleeve that surrounds the liner and moves through the annulus between the liner and flow sleeve, thereby convectively cooling the liner. As a result, the pressure of the air drops considerably between the compressor discharge case and the bundled tube fuel nozzles. A portion of the air is also directed into the axial fuel staging nozzles.

Applying the technologies described above to a smaller combustor and gas turbine engine frame (e.g., an F-class engine) would represent an advancement in the technology. In particular, a retrofittable F-class combustor that offers improved ability to burn hydrogen and significantly enhanced turndown; that achieves the same pressure ratio (dP/P), better NOx/T3.90 capability, and control of exit temperature profile; and that is delivered at a reasonable cost would represent an important advancement in gas turbine combustion technology.

SUMMARY

A combustor for a gas turbine engine comprises: a head end section defining a head end plenum and containing a fuel nozzle assembly; a liner extending downstream from the head end section to an aft frame and defining a combustion chamber; a first plurality of injectors disposed at a first axial location to direct a first fuel/air mixture through the liner; a second plurality of injectors disposed at a second axial location downstream from the first plurality of injectors to direct a second fuel/air mixture through the liner; wherein each of the head end section, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; and wherein the first plurality of injectors and the second plurality of injectors receive more than 50% of the air supply from the compressor discharge casing.

According to another aspect, a bundled tube fuel nozzle assembly for a gas turbine combustor comprises: a forward plate facing a head end air plenum, an aft plate facing a combustion chamber, a first plurality of premixing tubes extending from the forward plate to the aft plate, an interior side wall extending circumferentially around the plurality of premixing tubes and extending axially from the forward plate to the aft plate, and an exterior side wall extending circumferentially around the interior side wall and extending from the forward plate to the aft plate; wherein the forward plate, the aft plate, the interior side wall, and the exterior side wall define an exterior fuel plenum; wherein the forward plate, the aft pate, and the interior side wall define an interior fuel plenum in fluid communication with the exterior fuel plenum, and each premixing tube of the plurality of premixing tubes includes at least one fuel injection hole therethrough in fluid communication with the interior fuel plenum; and wherein the head end air plenum is in fluid communication with the combustion chamber, via inlet ends of the first plurality of premixing tubes.

In another aspect, a combustor for a gas turbine engine comprises: a head end section containing a fuel nozzle assembly; a liner extending downstream from the head end section to an aft frame and defining a combustion chamber therein; a first plurality of injectors disposed at a first axial location spaced apart from the head end section to direct a first fuel/air mixture through the liner; a second plurality of injectors disposed at a second axial location downstream from the first plurality of injectors to direct a second fuel/air mixture through the liner; wherein each of the head end section, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; and wherein the second plurality of injectors receives a respective second air supply that is greater than each of the respective first air supply to the first plurality of injectors and the respective third air supply to the head end section.

According to another aspect, a method of operating a gas turbine combustor having multiple axially spaced fuel stages comprises: selectively directing fuel and a first air supply through a fuel nozzle assembly in a head end section of the gas turbine combustor to produce a first fuel/air mixture and igniting within a liner that defines a combustion chamber to produce combustion gases, the liner extending downstream from the head end section to an aft frame; selectively directing a second fuel/air mixture through the liner from at least one of a first plurality of injectors disposed at a first axial location spaced from the head end section; selectively directing a third fuel/air mixture through the liner from at least one of a second plurality of injectors disposed at a second axial location downstream from the first plurality of injectors; wherein each of the fuel nozzle assembly, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; and wherein the second plurality of injectors receives a respective air supply that is greater than each of the respective air supplies of the fuel nozzle assembly and the first plurality of injectors.

A further aspect of the present disclosure includes a combustor head end section with an integrated cooling system, the combustor head end section comprising: a bundled tube fuel nozzle assembly for a gas turbine combustor, the bundled tube fuel nozzle assembly comprising: a forward plate facing a head end air plenum, an aft plate facing a combustion chamber, a first plurality of premixing tubes extending from the forward plate to the aft plate, and a side wall extending circumferentially around the first plurality of premixing tubes and extending axially from the forward plate to the aft plate; wherein the forward plate, the aft plate, and the side wall define a fuel plenum, and each premixing tube of the first plurality of premixing tubes includes at least one fuel injection hole therethrough in fluid communication with the fuel plenum; and wherein the head end air plenum is in fluid communication with a combustion chamber, via inlet ends of the first plurality of premixing tubes; and wherein the integrated cooling system comprises at least one air flow passage integral with an exterior surface of a respective premixing tube and extending from the forward plate to the aft plate.

A still further aspect of the present disclosure provides a combustor head end section with an air supply system, the combustor head end section comprising: a bundled tube fuel nozzle assembly for a gas turbine combustor, the bundled tube fuel nozzle assembly comprising: a forward plate facing a head end air plenum, an aft plate facing a combustion chamber, a first plurality of premixing tubes extending from the forward plate to the aft plate, and a side wall extending circumferentially around the first plurality of premixing tubes and extending axially from the forward plate to the aft plate; wherein the forward plate, the aft plate, and the side wall define a fuel plenum, and each premixing tube of the first plurality of premixing tubes includes at least one fuel injection hole therethrough in fluid communication with the fuel plenum; and wherein the air supply system comprises the head end air plenum, a first inlet flow conditioner partially defining the head end air plenum, and a second inlet flow conditioner, wherein the head end air plenum is in fluid communication with a combustion chamber, via the first plurality of premixing tubes, the first inlet flow conditioner surrounds the bundled tube fuel nozzle assembly, and the second inlet flow conditioner surrounds the first inlet flow conditioner.

According to another aspect of the present disclosure, a combustor head end section with an air supply system comprises: a bundled tube fuel nozzle assembly for a gas turbine combustor, the bundled tube fuel nozzle assembly comprising: a forward plate facing a head end air plenum, an aft plate facing a combustion chamber, a first plurality of premixing tubes extending from the forward plate to the aft plate, a side wall extending circumferentially around the first plurality of premixing tubes and extending axially from the forward plate to the aft plate, and an exterior side wall extending from the forward plate to the aft plate and surrounding the side wall; wherein the forward plate, the aft plate, and the side wall define a fuel plenum, and each premixing tube of the first plurality of premixing tubes includes at least one fuel injection hole therethrough in fluid communication with the fuel plenum; wherein the air supply system comprises the head end air plenum, an annular air plenum defined between the exterior side wall and the side wall, and a circumferential array of openings defined through the forward plate around a perimeter of the bundled tube fuel nozzle assembly; wherein the head end air plenum is in fluid communication with the annular air plenum, via the circumferential array of openings, and with the combustion chamber, via the first plurality of premixing tubes.

According to another aspect, a combustor for a gas turbine engine comprises: a head end section containing a fuel nozzle assembly and defining a head end air plenum; a liner extending downstream from the head end section toward an aft frame and defining a combustion chamber therein; a first plurality of injectors disposed at a first axial location spaced apart from the head end section to direct a first fuel/air mixture through the liner; and a dynamics mitigation system comprising a plurality of cold-side resonators disposed wholly within the head end air plenum, each resonator of the plurality of cold-side resonators having a resonator body with a closed end and an open neck extending from the resonator body opposite the closed end, wherein the resonator body defines a respective volume, and the open neck is in fluid communication with the head end air plenum.

Two or more aspects described in this disclosure, including those described in this summary section, may be combined to form implementations not specifically described herein. That is, all embodiments described herein can be combined with each other.

The details of one or more exemplary implementations are set forth in the accompanying drawings and the detailed description below. Other features, objects, and advantages will be apparent from the drawing and the description and from the claims.

BRIEF DESCRIPTION OF THE DRAWINGS

A full and enabling disclosure of the present products and methods, including the best mode thereof, directed to one of ordinary skill in the art, is set forth in the specification, which refers to the appended figures, in which.

DETAILED DESCRIPTION

Figure 1:
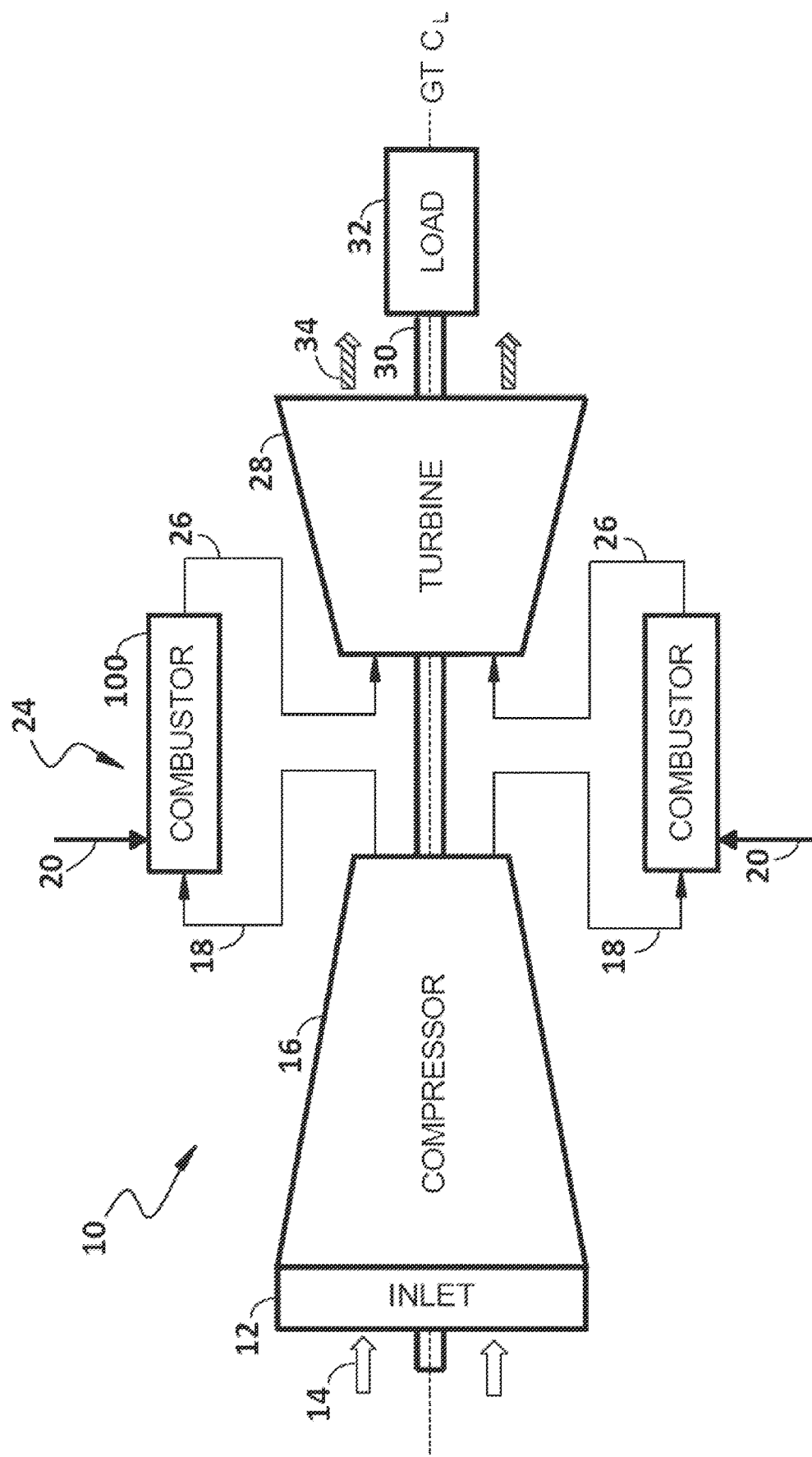
FIG. 1 is a schematic diagram of a gas turbine assembly with a combustion system, as described herein.

The following detailed description illustrates a gas turbine combustor having multiple axially spaced fuel stages and a method of operating such a gas turbine combustor, by way of example and not limitation. The description enables one of ordinary skill in the art to make and use the combustion system. The description provides several embodiments of the combustor assembly and its various components and includes what are presently believed to be the best modes of making and using the present combustion system. An exemplary combustion system is described herein as being part of a heavy-duty gas turbine assembly used for electrical power generation. However, it is contemplated that the combustion system described herein may have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft," without any further specificity, refer to directions, with "forward" referring to the front or compressor end of the gas turbine engine, and "aft" referring to the rearward or turbine end of the gas turbine engine.

The term "radially" refers to the relative direction that is substantially perpendicular to an axial centerline of a particular component, and the term "axially" refers to the relative direction that is substantially parallel to an axial centerline of a particular component. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape. If a first component resides closer to the axis (i.e., axial centerline) than a second component, it may be stated herein that the first component is "radially inward" or "inboard" of the second component. On the other hand, if the first component resides further from the axis than the second component, it may be stated herein that the first component is "radially outward" or "outboard" of the second component. As indicated above and depending on context, such terms may be applied in relation to the axis of the combustor or the axis of the gas turbine engine.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Each example is provided by way of explanation, not limitation of the invention. In fact, it will be apparent to those skilled in the art that modifications and variations can be made in the present combustion system and its components, without departing from the scope or spirit of the present disclosure. For instance, features illustrated or described as part of one embodiment may be used on another embodiment to yield a still further embodiment. Thus, it is intended that the present disclosure encompasses such modifications and variations as fall within the scope of the appended claims and their equivalents. Although exemplary embodiments of the present combustion system and method will be described generally in the context of a heavy duty, electrical power-generating gas turbine engine for purposes of illustration, one of ordinary skill in the art will readily appreciate that embodiments of the present disclosure may be applied to any combustor incorporated into any turbomachine and is not limited to a gas turbine combustor, unless specifically recited in the claims.

Reference will now be made in detail to various embodiments of the present combustion system and method, one or more examples of which are illustrated in the accompanying drawings. The detailed description uses numerical and letter designations to refer to features in the drawings. Like or similar designations in the drawings and description have been used to refer to like or similar parts.

FIG. 1 provides a functional block diagram of an exemplary gas turbine engine 10 that may incorporate various embodiments of the present disclosure. As shown, the gas turbine engine 10 generally includes an inlet section 12 that may include a series of filters, cooling coils, moisture separators, and/or other devices to purify and otherwise condition a working fluid (e.g., air) 14 entering the gas turbine engine 10. The working fluid 14 flows to a compressor section where a compressor 16 progressively imparts kinetic energy to the working fluid 14 to produce a compressed working fluid 18.

The compressed working fluid 18 is mixed with a (gaseous or liquid) fuel 20 to form a combustible mixture within one or more combustors 100 of a combustion section or system 24. The combustible mixture—whether gaseous and/or liquid fuel—is burned to produce combustion gases 26 having a high temperature, pressure, and velocity. The combustion gases 26 flow through an expansion turbine 28 of a turbine section to produce work. For example, the expansion turbine 28 may be connected to a shaft 30 so that rotation of the expansion turbine 28 drives the compressor 16 to produce the compressed working fluid 18. Alternately or in addition, the shaft 30 mayconnect the expansion turbine 28 to a load, such as generator 32 for producing electricity.

Exhaust gases 34 from the expansion turbine 28 flow through an exhaust section (not shown) that connects the expansion turbine 28 to an exhaust stack downstream from the gas turbine engine 10. The exhaust section may include, for example, a heat recovery steam generator (not shown) for cleaning and extracting additional heat from the exhaust gases 34 prior to release to the environment.

In a F-class engine (e.g., a 9-frame, F-class engine from GE Vernova of Greenville, SC), a compressor discharge casing partially defines a compressor discharge plenum that surrounds a portion of each of the combustors (sometimes referred to as "combustor cans"). An expansion turbine casing, or shell, forms the aftmost outer boundary of the plenum, and an inner barrel defines the innermost boundary. Each combustor is installed through one of a circumferential array of openings in the compressor discharge casing and are positioned between struts that support the compressor discharge casing. For an F-class engine, the openings in the compressor discharge casing have a diameter of approximately 20 inches. The combustors also join, at their aft ends, to hot gas path hardware (e.g., the first stage hardware of the expansion turbine). Thus, the subject combustor 100 is configured to be retrofit into the existing environment for an F-class engine with its defined opening size, strut locations, and expansion turbine hardware position. Conventional F-class combustors have a head end portion with swozzle-type (swirling nozzle) fuel nozzles and a large head end diameter and a length-to-diameter ratio of about 3.4, where the length is measured from the head end portion to the aft frame.

Figure 2:
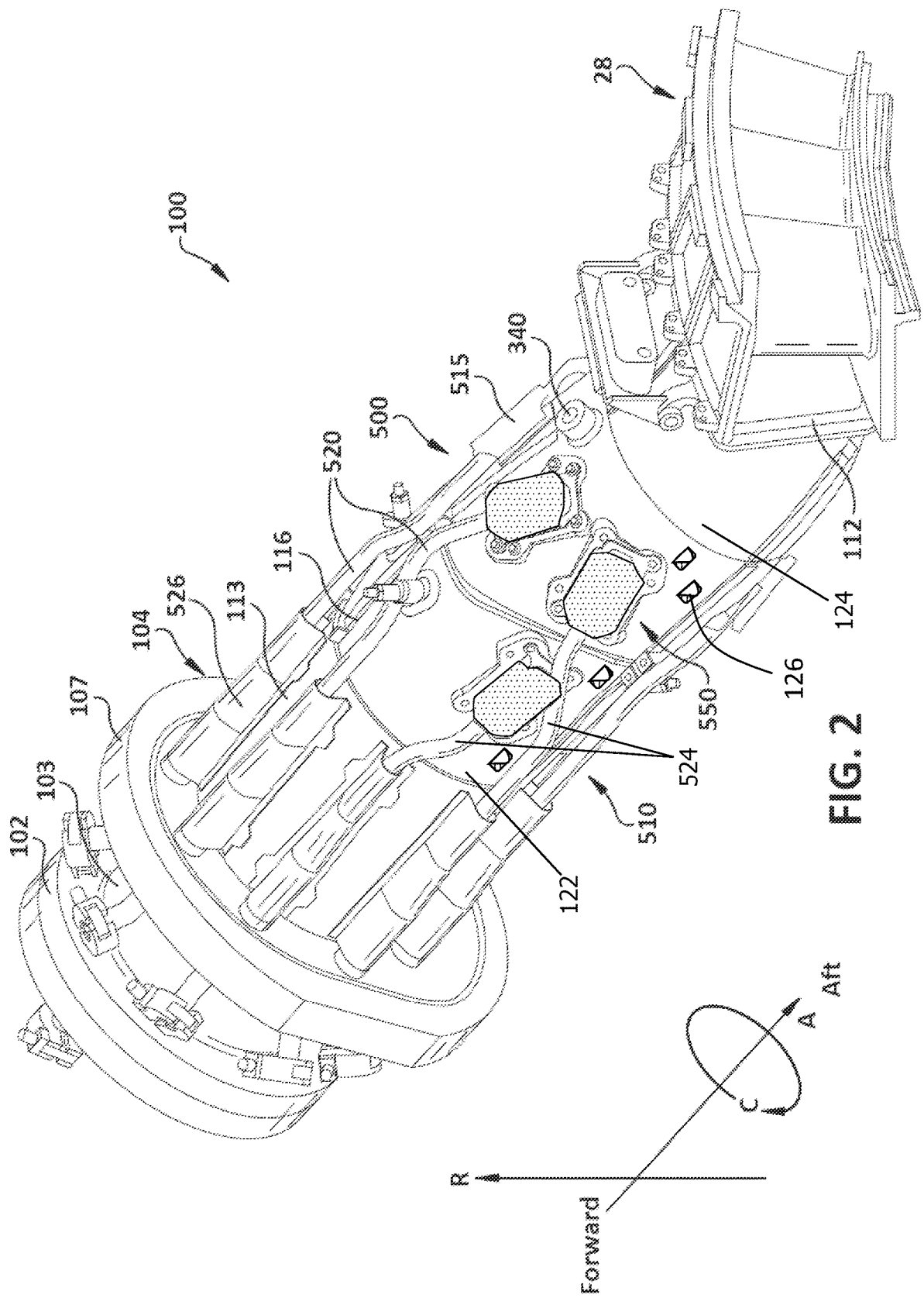
FIG. 2 is a perspective view of a combustor with multiple axial fuel stages for use in the gas turbine assembly of FIG. 1, according to the present disclosure.
Figure 3A:
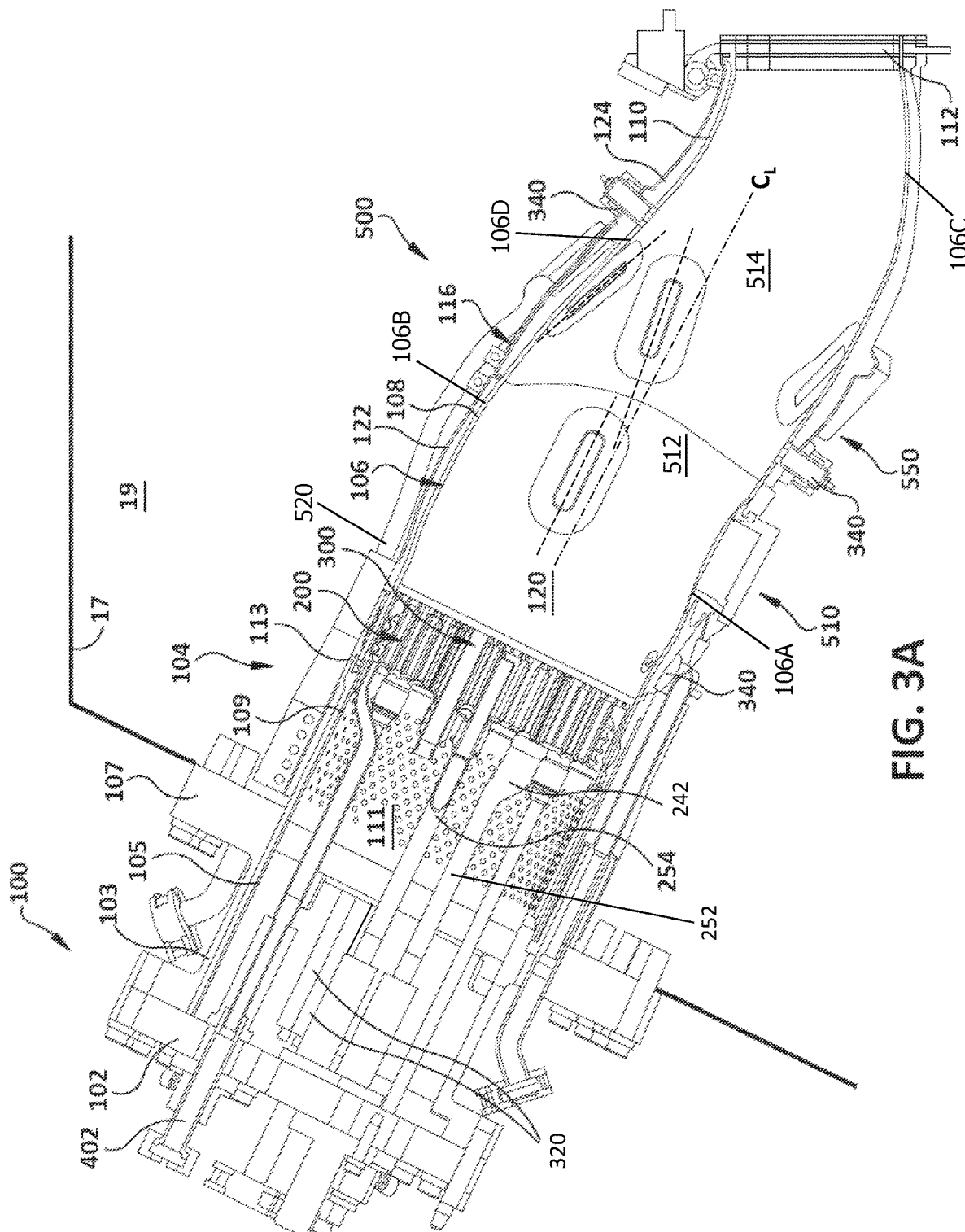
FIGS. 3A and 3B are detailed and schematic cross-sectional views, respectively, of the combustor of FIG. 2.
Figure 3B:
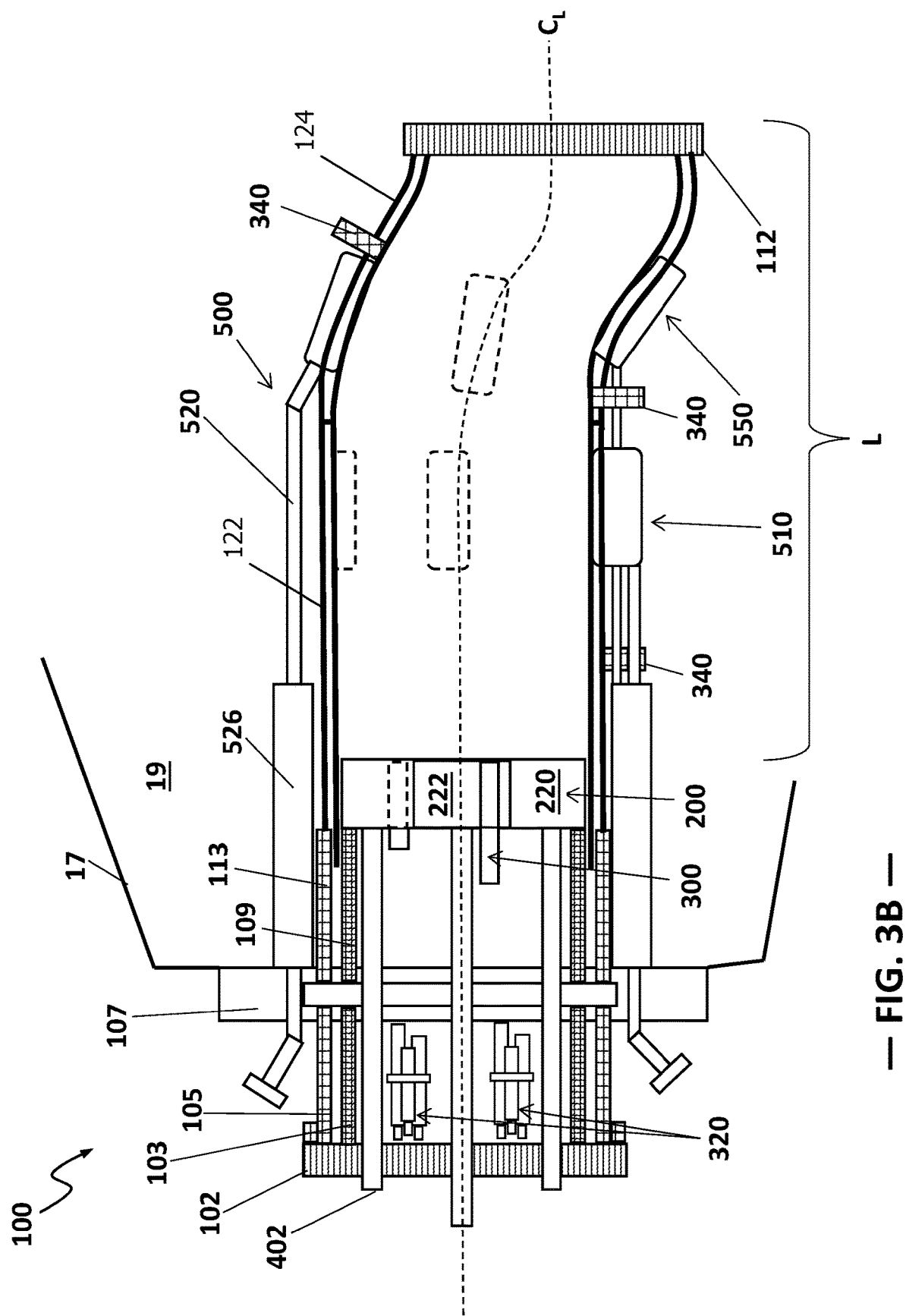
Figure 4:
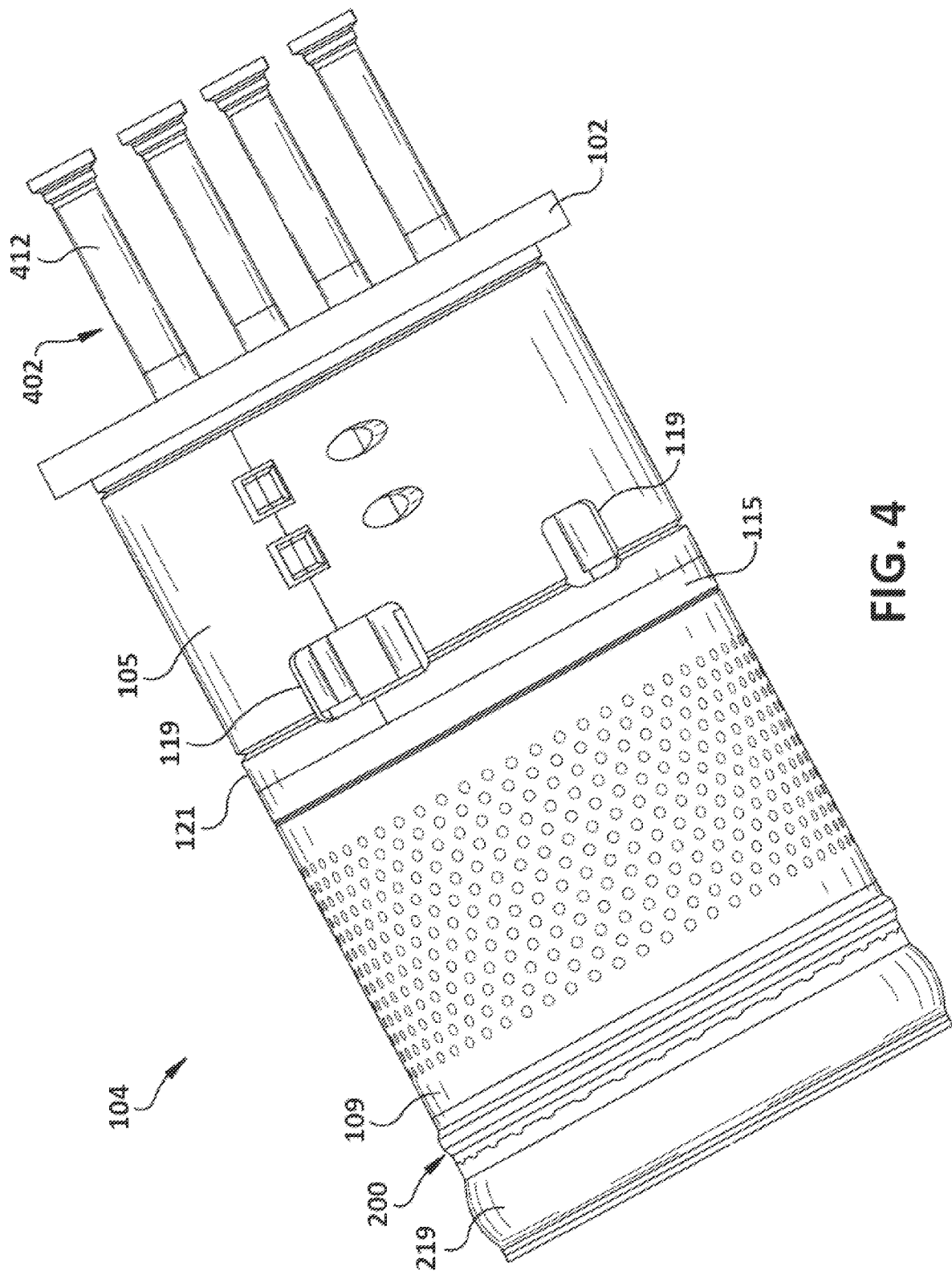
FIG. 4 is a side perspective view of a combustor head end section, according to aspects of the present disclosure.

FIG. 2 is a perspective view of the combustor 100 of combustion section 24, which is shown schematically in FIG. 1. FIGS. 3A, 3B, and 4 are cross-sectional views of the combustor 100.

The combustor 100 includes an end cover 102 to which a bundled tube fuel nozzle assembly 200 is coupled. The end cover 102 defines the forward boundary of the combustor head end section 104. The bundled tube fuel nozzle assembly 200 defines the aft boundary of the combustor head end section 104 and the forward boundary of a combustion chamber. The head end section 104 further includes a flanged forward casing 103 that circumferentially extends around an inner support barrel 105 and that axially extends between the end cover 102 and a combustor mounting flange 107. The combustor mounting flange 107 mounts the combustor 100 to a compressor discharge casing 17 that surrounds portions of all of the combustors 100 of the gas turbine engine 10 and that defines a compressor discharge plenum 19, which receives compressed working fluid (e.g., air) 18 from the compressor 16.

An inner, or first, inlet flow conditioner (IFC) 109 extends between the mounting flange 107 and the bundled tube fuel nozzle assembly 200 that defines the downstream boundary of the head end section 104 and that separates the head end section 104 from the primary combustion zone 120. The end cover 102, the inner support barrel 105, and the inner inlet flow conditioner 109 collectively define a head end air plenum 111, which supplies air to the bundled tube fuel nozzle assembly 200. The bundled tube fuel nozzle assembly 200 has a suitably sized diameter to be retrofit into an existing F-class engine (e.g., a diameter of between 12 to 14 inches, or between about 30.5 to about 35.5 centimeters, as compared to a diameter of between 18 and 20 inches, or between about 45.7 to about 50.8 centimeters, for an H-class engine). That is, the bundled tube fuel nozzle assembly 200 spans the entire diameter of the forward end of the liner 106, in contrast to conventional combustion systems in which multiple fuel nozzles are installed in a cap plate assembly, and the cap plate assembly spans the diameter and defines the upstream boundary of the combustion chamber.

The inner inlet flow conditioner 109 is surrounded by an outer, or second, inlet flow conditioner 113, such that an annular gap is provided between the inner IFC 109 and the outer IFC 113. Both the inner IFC 109 and the outer IFC 113 are cylindrical ducts that are perforated with a plurality of holes to permit airflow into the head end air plenum 111 from the compressor discharge casing 17 that surrounds the combustor 100. The two sets of perforations in the outer inlet flow conditioner 113 and the inner inlet flow conditioner 109 are configured (in size, number, and alignment) to achieve the desired pressure drop for compressed air 18 entering the bundled tube fuel nozzle assembly 200. In particular, the perforations in the outer IFC 113 are larger than the perforations in the inner IFC 109, and the perforations in the outer IFC 113 are aligned with the perforations in the inner IFC 109. Such sizing and alignment are important, since the perforations in the inner inlet flow conditioner 109 have been found to have the greatest impact on the pressure drop of the airflow.

FIG. 4 provides a perspective view of the inner components of the head end section 104 of the combustor 100, which includes, in series from the forward end, a plurality of fuel conduits 402 (specifically, fuel connection conduits 412), the end cover 102, the inner support barrel 105, an inner support barrel flange 121, an inner IFC mounting flange 115, the inner IFC 109, the bundled tube fuel nozzle assembly 200, and an inner hula seal 219 surrounding the bundled tube fuel nozzle assembly 200. In an exemplary embodiment, the inner IFC 109 is welded, at its aft end, to the bundled tube fuel nozzle assembly 200 and, at its forward end, to the inner IFC mounting flange 115. The inner support barrel flange 121 may be made in two circumferential segments that collectively define an annular ring. The inner support barrel 105 is formed of two circumferential halves that are bolted, or otherwise secured together, to collectively define a full cylindrical shape. The inner support barrel 105 may include one or more windows 119 to facilitate joining of the inner support barrel 105 to the inner IFC 109. The two circumferential segments, or halves, of the inner support barrel 105 are welded to the circumferential segments of the inner support barrel flange 121, and the segments of the inner support mounting flange 121 are bolted to the inner IFC mounting flange 115. The forward end of the inner support barrel 105 (i.e., each circumferential half) is welded to a corresponding semi-circular panel of the end cover 102. The two semi-circumferential panels of the end cover 102 are bolted, or otherwise removably secured together, to collectively define the forward boundary of the head end air plenum 111.

It should be noted that the above assemblage of the inner components of the head end section 104 is exemplary and should not be considered limiting of the subject technology. The head end section 104, including its inner components discussed above, is configured to achieve various technical and practical objectives, such as providing airflow at the desired pressure to the bundled tube fuel nozzle assembly 200, facilitating assembly and maintenance of the head end section 104, and satisfying mechanical and aerodynamic requirements for operation and durability. With the described coupling of the components of the head end section 104, the head end section 104 (e.g., including the bundled tube fuel nozzle assembly 200 and the inner IFC 109) may be collectively removeable from the liner 106 of the combustor 100. Additionally, an igniter, a flame detector, a dynamics pressure sensor, and/or other sensors may be disposed within the head end air plenum 111 or in close proximity to the head end section 104 (e.g., slightly downstream of the bundled tube fuel nozzle 200).

As shown in FIGS. 2, 3A, and 3B, the combustor includes a liner 106 and an outer sleeve 116. The liner 106 defines a combustion chamber having a length "L" from the head end section 104 (e.g., from the aft surface of the bundled tube fuel nozzle assembly 200) to an aft frame 112, where the length-to-head end diameter ratio is about 2.7. The liner 106 has a generally cylindrical upstream portion 108 and a tapering downstream portion 110 that extends between the upstream portion 108 and the aft frame 112. The upstream and downstream portions 108, 110 of the liner 106 may be continuous along the length of the combustor 100 or may be formed as a first (e.g., an upper or radially outward) clamshell component and a second (e.g., a lower or radially inward) clamshell component that are joined by welding. Unlike many conventional F-series combustors, which have separate cylindrical and tapered portions that are coupled at a sealed joint, the present liner 106 can be considered as a "unibody" in which the cylindrical portion 108 and the tapering portion 110 are integral with one another. As a result, the elimination of the seal prevents loss of air flow between the portions 108 and 110.

Unlike the liner 106 that extends axially between the head end section 104 and the aft frame 112, the outer sleeve 116 includes a forward (first) impingement sleeve 122 and an aft (second) impingement sleeve 124 to span the length L of the combustor 100. The forward impingement sleeve 122 circumferentially surrounds a first plurality of injectors 510 and extends axially from the head end section 104 to the aft impingement sleeve 124. The aft impingement sleeve 124 circumferentially surrounds a second plurality of injectors 550 and extends axially from the forward impingement sleeve 122 to the aft frame 112. The forward impingement sleeve 122 includes a plurality of apertures that are configured (sized and shaped) to deliver airflow from the compressor discharge plenum 19 at a prescribed first pressure drop for the first plurality of injectors.

The aft impingement sleeve 124 includes a plurality of apertures that are configured (sized and shaped) to deliver airflow from the compressor discharge plenum 19 at a prescribed second pressure drop for the second plurality of injectors, where the first pressure drop is different from the second pressure drop. In one embodiment, the first pressure drop is less than the second pressure drop. A first annulus is defined between the first impingement sleeve 122 and the liner 106, and a second annulus is defined between the second impingement sleeve 124 and the liner 106. The first annulus is fluidly isolated from the second annulus, such that the airflow through each impingement sleeve 122, 124 is dedicated to a respective plurality of injectors. As described herein, the air flows to the head end section 104 (e.g., the bundled tube fuel nozzle assembly 200), the first plurality of injectors 510, and the second plurality of injectors 550 are discrete from one another.

To help channel air from the compressor discharge plenum into the respective first annulus or second annulus, the impingement sleeve(s) 122, 124 may be provided with one or more aerodynamic scoops 126 (FIG. 2) that project from the outer surface of the respective impingement sleeve 122, 124 into the high-speed air flow passing the respective impingement sleeve 122, 124. The aerodynamic scoops 126 act as flow-catching devices that, by a combination of stagnation and redirection, catch and redirect air that would have previously passed the impingement apertures due to the lack of static pressure differential to drive the air flow through them. The scoops 126 direct the air flow inwardly onto the hot surfaces of the liner 106, thus reducing the metal temperature to acceptable levels and enhancing the cooling capability of the impingement sleeve(s) 122, 124. Moreover, the scoops 126 help ensure that sufficient air flow is directed to the respective plurality of AFS injectors 510, 550.

The scoops 126 are mounted, or formed, on the surface of the respective impingement sleeve 122, 124, in proximity to the impingement sleeve apertures along the side panels of the impingement sleeve 122, 124. The scoop 126 can at least partially surround one of the impingement sleeve apertures and can include a first portion mounted, or formed, on the surface and an edge that defines an open side of the scoop 126. The edge may be oriented in a plane substantially normal to the surface of the impingement sleeve 122, 124, or at some other angle toward the direction of the air flow. In instances where the impingement sleeve 122, 124 is produced by additive manufacturing, the scoops 126 may be integrally formed with the respective impingement sleeve 122, 124. Alternately, the scoops 126 may be welded to the respective impingement sleeve 122, 124. The number and location of the scoops 126 are defined by the shape of the impingement sleeve 122, 124, flow within the compressor discharge casing 17, and thermal loading on the liner 106 by the combustor 100.

Each of the fuel injection systems (bundled tube fuel nozzle assembly and axial fuel staging injectors) will be discussed in detail as follows, beginning with the bundled tube fuel nozzle assembly 200 and with references to FIGS. 5 through 13. Although the head end section 104 is illustrated as including the bundled tube fuel nozzle assembly 200 described herein, it should be appreciated that the head end section 104 may include other types of fuel nozzle assemblies, e.g., which are mounted in a cap plate that defines the forward boundary of the combustion chamber. In other words, an aft plate 204 of the bundled tube fuel nozzle assembly 200 may be replaced with a conventional cap plate, which itself may benefit from the cooling system disclosed herein.

The bundled tube fuel nozzle assembly 200 includes a forward plate 202 facing the head end air plenum 111, the aft plate 204 facing the combustion chamber (e.g., primary combustion zone 120), a plurality of premixing tubes 210 extending from the forward plate 202 to the aft plate 204, and a side wall 206 extending circumferentially around the plurality of premixing tubes 210 and extending axially from the forward plate 202 to the aft plate 204. The forward plate 202, the aft plate 204, and the side wall 206 collectively define a fuel plenum 220 (e.g., an interior fuel plenum) that surrounds a first plurality of the premixing tubes 210. The head end air plenum 111 is in fluid communication with the combustion chamber 120, via inlets of the premixing tubes 210. Each premixing tube 210 includes at least one fuel injection hole 216 therethrough (most clearly seen in FIG. 13) that is in fluid communication with the fuel plenum 220. The bundled tube fuel nozzle assembly 200 spans an entire diameter of the head end section 104.

More specifically, each premixing tube 210 defines a premix passage and extends from an inlet 212 defined in the forward plate 202, through the fuel plenum 220, to an outlet 214 defined in the aft plate 204. At least one fuel injection hole 216 may be defined through each premixing tube 210 of the plurality of premixing tubes 210 to provide for fluid communication between the fuel plenum 220 and the internal premix passage. In operation, each premix passage 210 may receive air at the inlet 212 and fuel at the fuel injection hole(s) 216, which mix together and are exhausted as a fuel/air mixture at the outlet 214 for combustion in the primary combustion zone 120. It should be appreciated that the bundled tube fuel 200 may include any number of premixing tubes 210, and the present disclosure should not be limited to any particular number of tubes 210, unless specifically recited in the claims.

Figure 6:
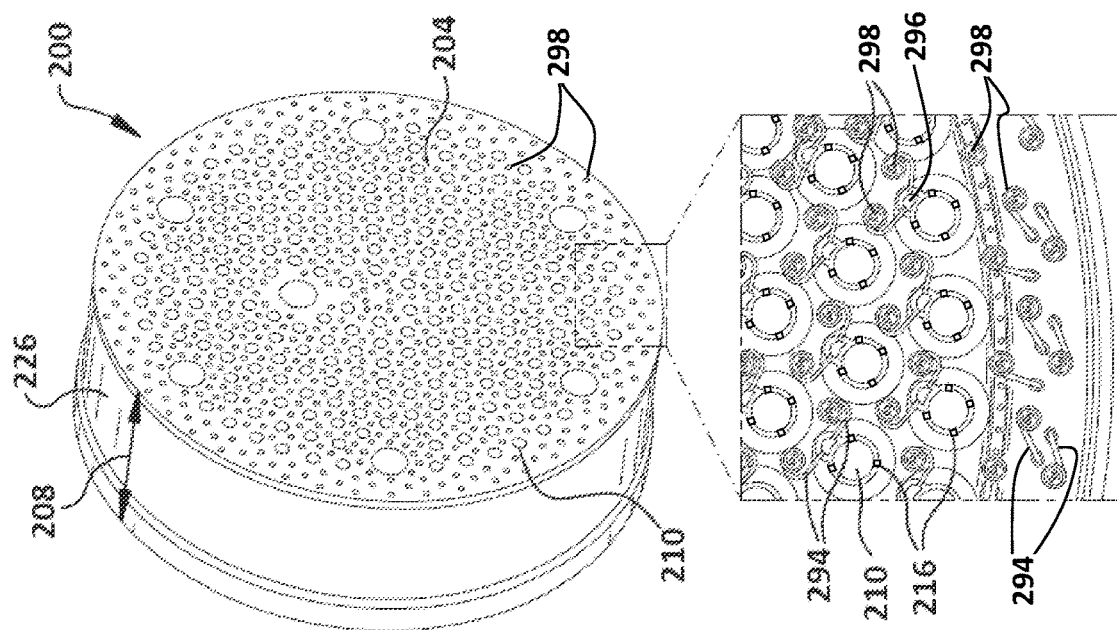
FIG. 6 is a perspective view of an aft side of the bundled tube fuel nozzle assembly of FIG. 5, according to aspects of the present disclosure, and including an enlarged view of cooling features associated with the bundled tube fuel nozzle assembly.

The side wall 206 of the bundled tube fuel nozzle assembly 200 defines an interior side wall, and the fuel plenum 220 is an interior fuel plenum. The interior side wall (i.e., side wall 206) is surrounded by an exterior side wall 226 having an axial length 208 suitable to facilitate additive manufacturing. By way of example, the axial length 208 may be about 4 inches (about 10 centimeters). An exterior fuel plenum 230 is defined between the interior side wall 206 and the exterior side wall 226 (specifically between the interior side wall 206 and a plenum wall 224) and extends circumferentially around the first plurality of premixing tubes 210. At least one fuel conduit 402 (FIG. 4) is coupled to the forward plate 202 in fluid communication with the exterior fuel plenum 230. Notably, the exterior fuel plenum 230 is devoid of premixing tubes 210 (that is, no premixing tubes 210 extend through or in direct fluid communication with the exterior fuel plenum 230). As shown in FIG. 6, the perimeter of the bundled tube fuel nozzle assembly 200 includes only cooling features (discussed below) and lacks premixing tubes 210.

Figure 7:
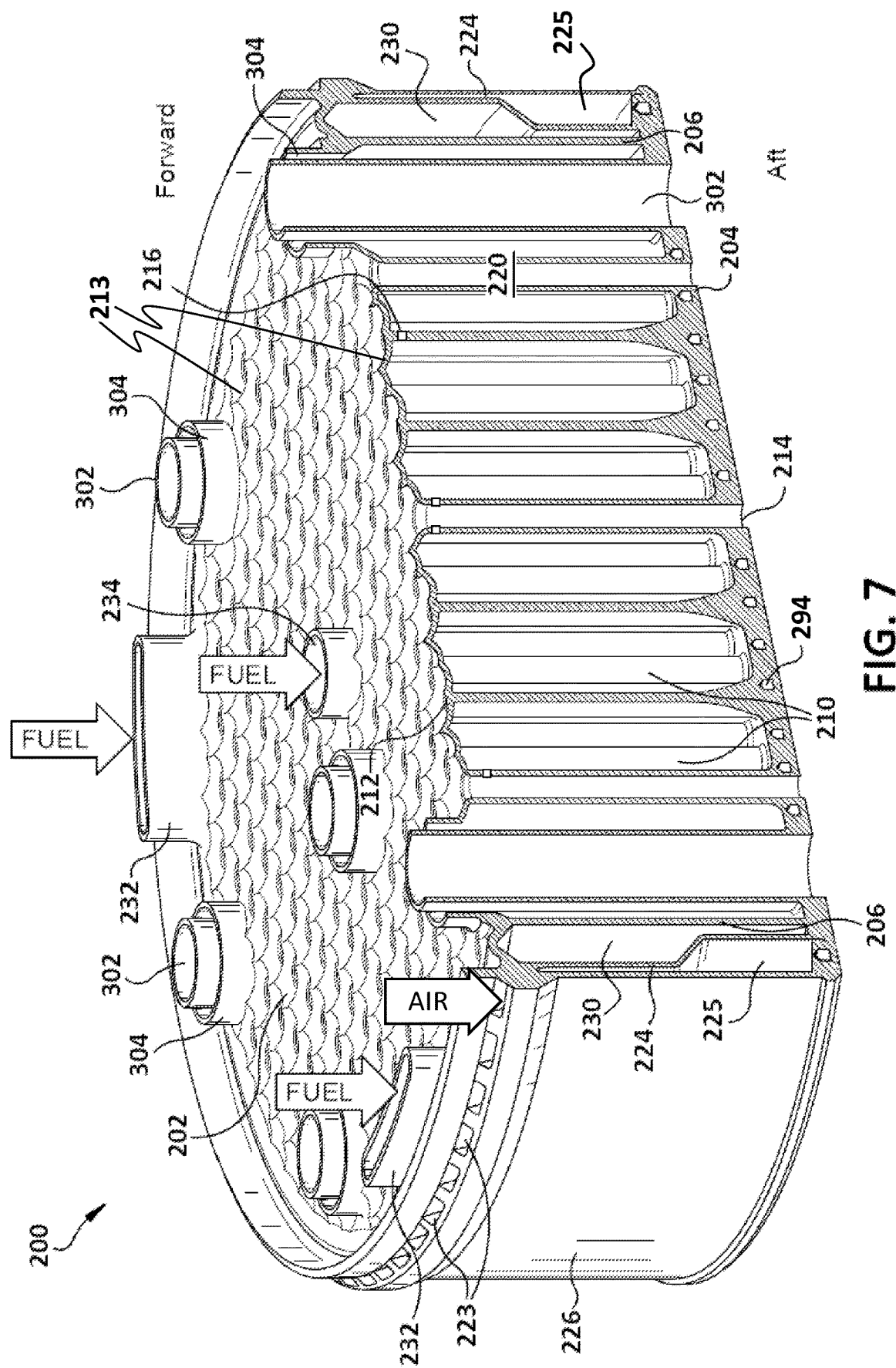
FIG. 7 is a partial cross-sectional view of the bundled tube fuel nozzle assembly of the present disclosure.
Figure 8:
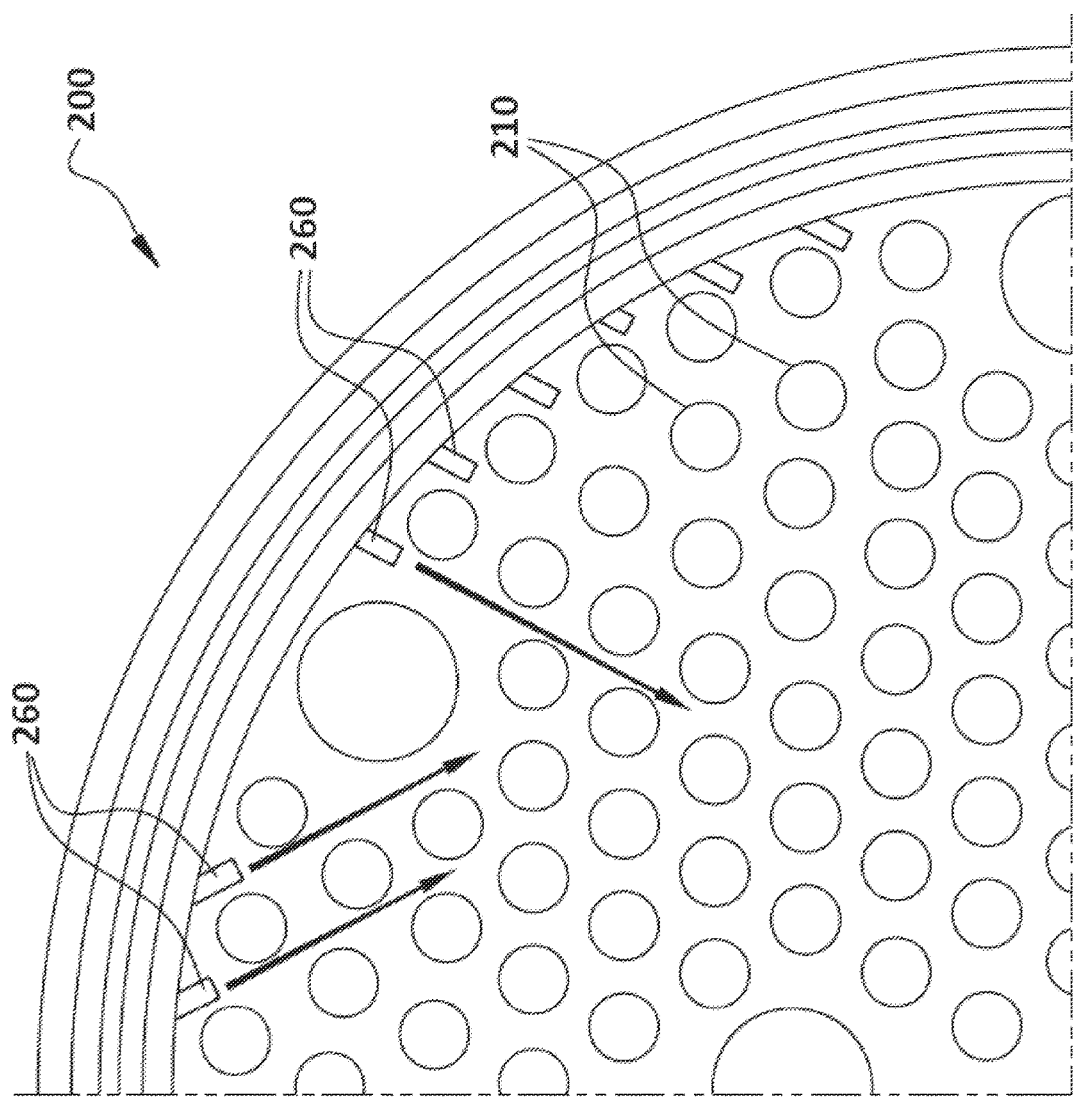
FIG. 8 is an interior plan view of a portion of the bundled tube fuel nozzle assembly of the present disclosure.

More specifically, as illustrated in FIG. 7, a plurality of slot-shaped fuel inlets 232 extend outwardly (i.e., upstream) from the forward plate 202 to fluidly couple the exterior fuel plenum 230 to a respective fuel conduit 402. The slot-shaped fuel inlets 232, which are built integrally with the bundled tube fuel nozzle assembly 200, are circumferentially spaced around the perimeter of the bundled tube fuel nozzle assembly 200. Any number of slot-shaped fuel inlets 232 may be used, two of which are shown in FIG. 7, which is a partial cross-sectional view of an embodiment having three slot-shaped fuel inlets 232. Thus, as shown, each of a plurality of circumferentially spaced coupling conduits 242 is in fluid communication with the exterior fuel plenum 230.

Fuel is delivered by fuel coupling conduits 242 (FIG. 3A, 9, 10) that are welded to the slot-shaped fuel inlets 232 and flows into the annular exterior fuel plenum 230. In one embodiment, from the exterior fuel plenum 230, fuel enters the interior fuel plenum 220 by flowing through groups of fuel delivery chutes 260 (FIG. 8) that are arranged in groups around the perimeter of the bundled tube fuel nozzle assembly 200. The chutes 260 are disposed tangentially relative to a radius of the bundled tube fuel nozzle assembly 200 and are oriented to direct fuel between adjacent rows of premixing tubes 210, as represented by arrows. Such an orientation facilitates the fuel distribution from the perimeter toward the center of the bundled tube fuel nozzle assembly 200. Because the air 18 flowing through the premixing tubes 210 is significantly hotter than the fuel, the fuel picks up heat from the premixing tubes 210 as the fuel traverses the interior fuel plenum 220. The fuel passes through one or more fuel injection holes 216 (FIG. 13) and mixes inside the premixing tubes 210 before being delivered to the combustion chamber (e.g., primary combustion zone 120).

Figure 9:
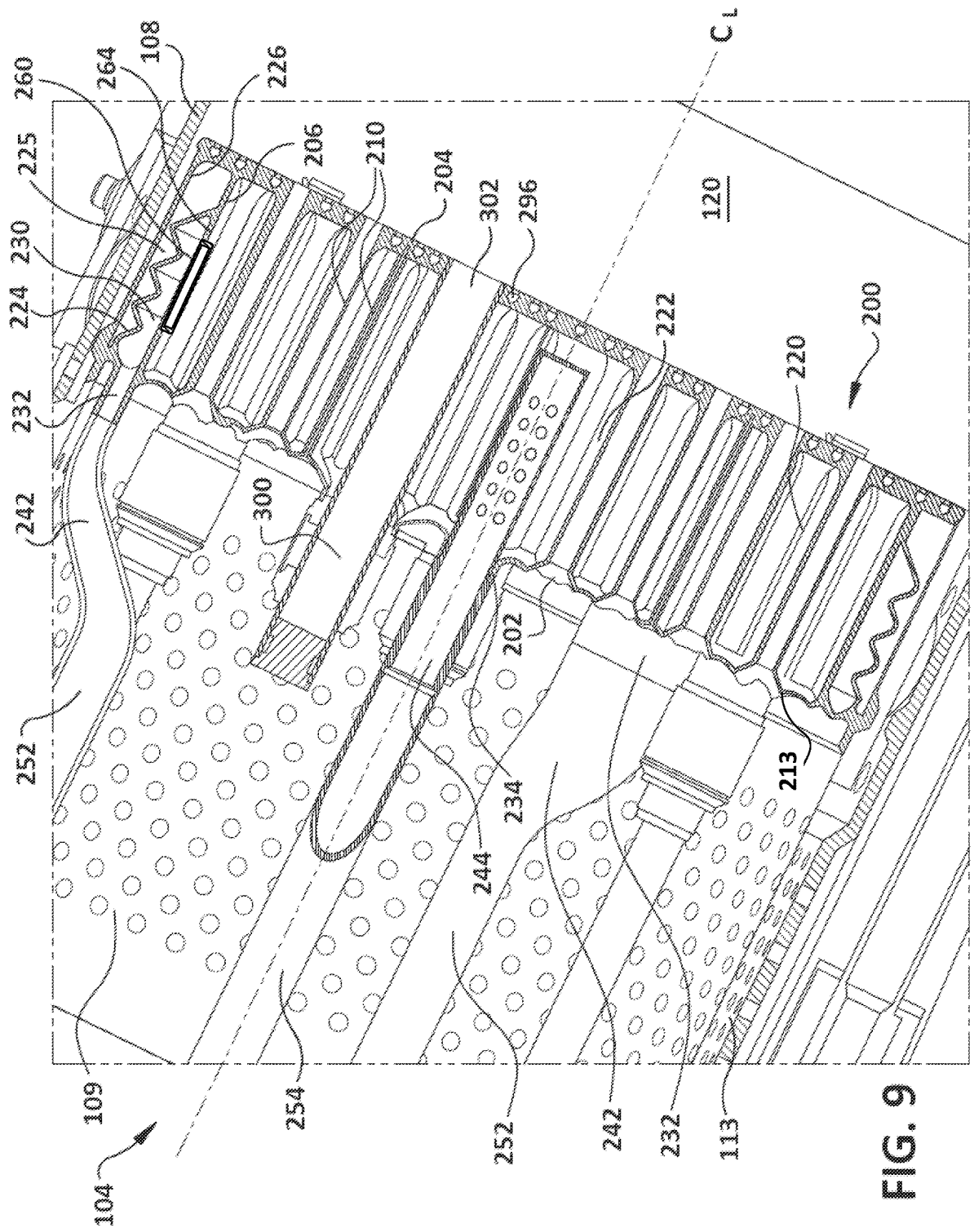
FIG. 9 is an enlarged cross-sectional view of a head end section of a combustor, according to the present disclosure.

FIG. 9 provides an alternate view of the chutes 260, which are arranged around the perimeter of the bundled tube fuel nozzle assembly 200. The openings 260 extend inwardly from the exterior fuel plenum 230 relative to a radius of the bundled tube fuel nozzle assembly 200 to fluidly connect the exterior fuel plenum 230 to the interior fuel plenum 220. Because the air 18 flowing through the premixing tubes 210 is significantly hotter than the fuel, the fuel picks up heat from the premixing tubes 210 as the fuel traverses the interior fuel plenum 220. The fuel passes through one or more fuel injection holes 216 and mixes inside the premixing tubes 210 before being delivered to the combustion chamber (e.g., primary combustion zone 120).

In exemplary embodiments, as shown in FIG. 9 and as described in co-pending U.S. patent application Ser. Nos. 18/081,924 and 18/081,949, both filed Dec. 15, 2022, the plenum wall 224 defining the exterior fuel plenum 230 has a corrugated bellows shape, and the interior side wall 206 that extends axially between the forward plate 202 and the aft plate 204 may include a self-breaking portion 264. The bellows-shaped plenum wall 224 intersects the interior side wall 206 aft of the self-breaking portion 264. The bellows-shaped plenum wall 224 and the self-breaking portion 264 of the interior side wall 206 may extend annularly about the axial centerline $C_L$ of the bundled tube fuel nozzle assembly 200 to help manage thermal stresses resulting from temperature differences between the fuel and the compressed air.

The interior side wall 206 is radially spaced apart from the exterior side wall 226, such that an annular plenum 225 is defined therebetween and is more specifically defined between the bellows-shaped plenum wall 224 and the exterior side wall 226. The annular plenum 225 is an air plenum, which is fed by air entering through a plurality of openings 223 (FIG. 7) defined around the perimeter of the bundled tube fuel nozzle assembly 200. The air entering openings 223 is supplied from the head end air plenum 111. As shown in FIG. 6, air from annular plenum 225 is directed through perimeter cooling channels 294 defined in the aft plate 204 and exits into the combustion chamber via swirl funnels 298, as discussed below.

Figure 10:
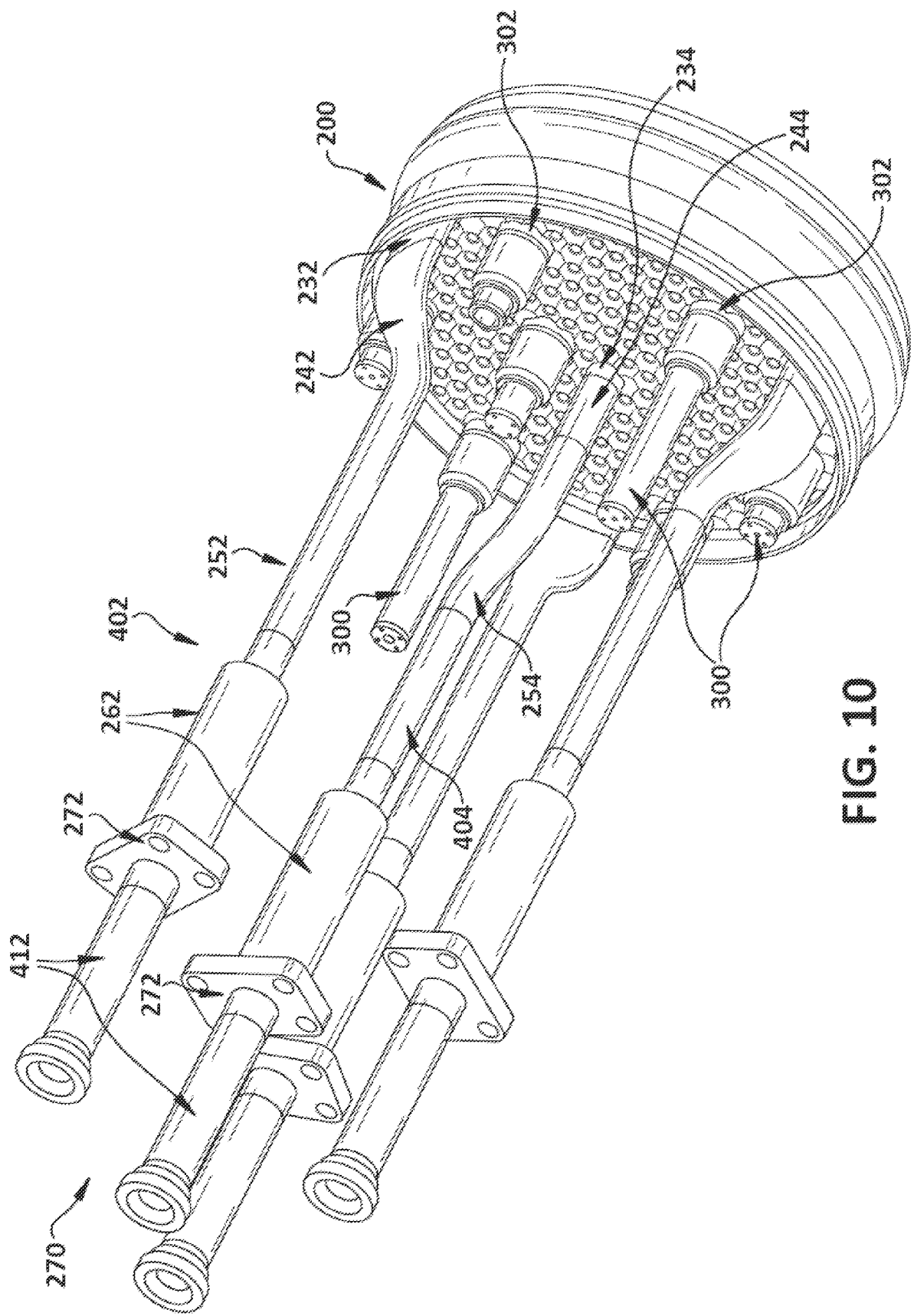
FIG. 10 is a perspective view of the bundled tube fuel nozzle assembly and associated fuel conduits, according to aspects of the present disclosure.

The fuel delivery system 270 for the bundled tube fuel nozzle assembly 200 is illustrated in FIG. 10. In the exemplary embodiment, three fuel conduits 402 and a center fuel conduit 404 are illustrated. As discussed above, a plurality of (e.g., three) fuel coupling conduits 242 (FIG. 3A) are welded to the slot-shaped fuel inlets 232 of the bundled tube fuel nozzle assembly 200. Each fuel coupling conduit 242 has a forward end having a circular cross-section and an aft end having a slot-shaped cross-section. The forward end of each fuel coupling conduit 242 is welded to a straight tube section 252 that extends between the fuel coupling conduit 242 and a fuel line bellows 262 (e.g., a single or double fuel bellows assembly). The fuel line bellows 262 reduces the likelihood of fuel leakage outside of the head end section 104 of the combustor 100. The fuel line bellows 262 is attached to a mounting flange 272 for attaching the respective fuel conduit 402 to the end cover 102. A fuel connection conduit 412 extends forward of the end cover 102 for connecting to a fuel supply line (not shown) external to the combustor 100. The fuel conduit 402 is straight (free from bends) as the fuel conduit 402 extends from the fuel conduit 242 through the end cover 102, and there are no fuel seals or fittings (e.g., compression fittings) within the end cover 102 that could potentially degrade or fail and result in leakage. The absence of fuel seals and fittings is especially important when operating on highly reactive fuels, such as hydrogen.

As shown in FIGS. 5, 7, 9, and 10, the bundled tube fuel nozzle assembly 200 is provided with a center fuel inlet 234 that is integrally formed with the bundled tube fuel nozzle assembly 200 and that extends axially outward from the forward plate 202. A coupling conduit 244 is attached to the center fuel inlet 234, and a fuel conduit 254 is joined to the coupling conduit 244. In this case, the coupling conduit 244 is straight, and the fuel conduit 254 may be provided with a curved portion. As illustrated, the center fuel inlet 234, the coupling conduit 244, and the fuel conduit 254 may each have a circular cross-section, although other cross-sectional shapes may be used instead. As with the fuel conduits 402, a fuel line bellows 262 is used to reduce the likelihood of fuel leakage from the center fuel conduit 404. The center fuel conduit 404 also includes a mounting flange 272 for coupling to the end cover 102 and a fuel connection conduit 412 for coupling to an external fuel supply line (not shown).

Figure 11:
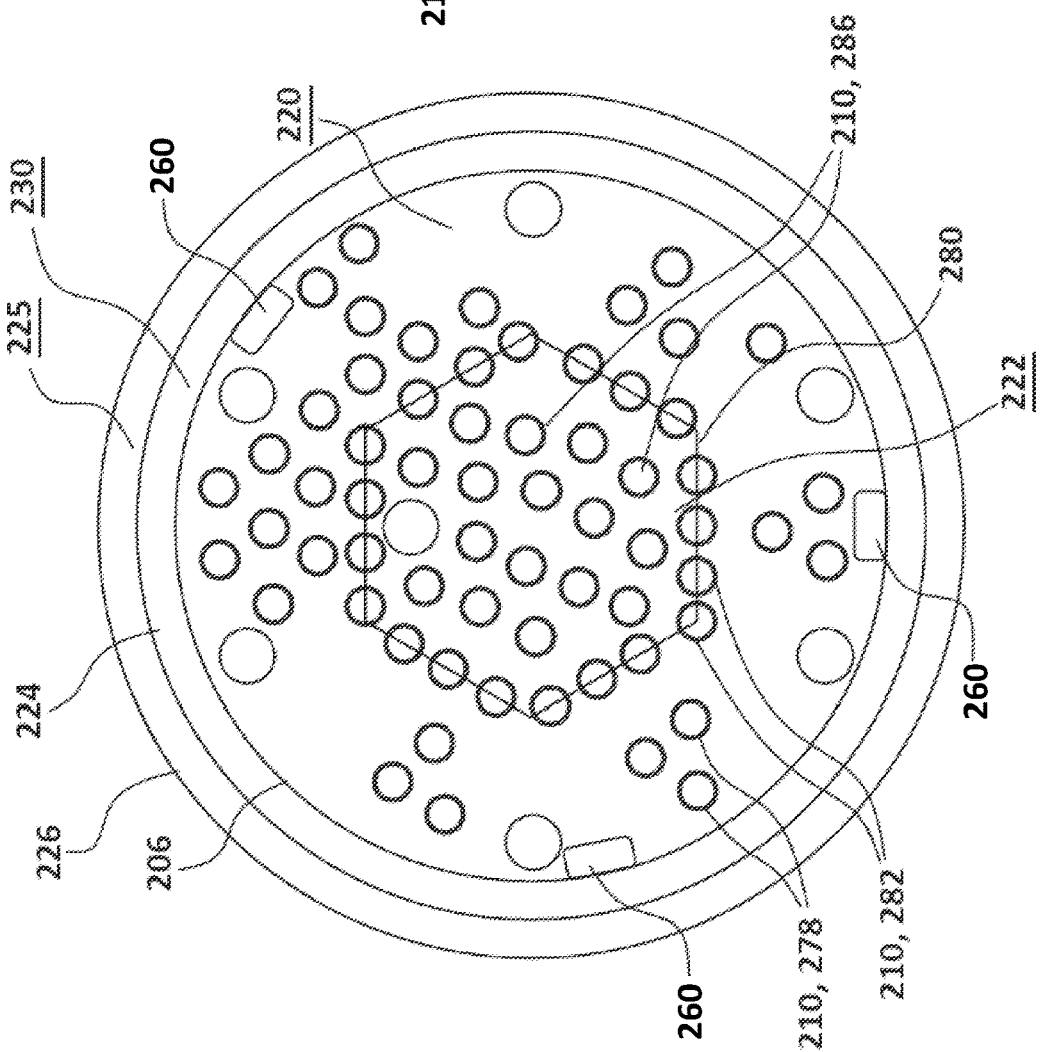
FIG. 11 is a schematic depiction of an aft face of the bundled tube fuel nozzle assembly of the present disclosure.

The center fuel conduit 404 provides fuel to a center fuel plenum 222, which is schematically illustrated in FIG. 11. For simplicity, FIG. 11 only represents a portion of the premixing tubes 210. The center fuel plenum 222 is defined by a partition 280 that includes a plurality of boundary premixing tubes 282 and boundary air flow passages 284 disposed between each pair of adjacent boundary premixing tubes 282. The partition 280 extends axially from the forward plate 202 to the aft plate 204, and the boundary air flow passages 284 are in fluid communication with the head end air plenum 111. Each boundary air flow passage 284 of the plurality of boundary air flow passages has a uniform cross-sectional shape from an inlet at the forward plate 202 to an outlet defined in the aft plate 204. As will be discussed further below, the outlet is fluidly coupled to one or more cooling channels 294 defined in the aft plate 204.

As a result of the partition 280, the premixing tubes 210 define a radially outer group of premixing tubes 210, 278 that are in fluid communication with the interior fuel plenum 220; a radially inner group of premixing tubes 210, 286 that are in fluid communication with the center fuel plenum 222; and the aforementioned boundary premixing tubes 210, 282 that are positioned along the partition 280 and that form part of the partition 280. As shown best in FIG. 13, the boundary premixing tubes 210, 282 have a plurality of fuel injection holes 216, at least one fuel injection hole 290 being in fluid communication with the interior fuel plenum 220 and at least one fuel injection hole 292 being in fluid communication with the center fuel plenum 222. The presence of the boundary premixing tubes 282 between the interior fuel plenum 220 and the center fuel plenum 222 mitigates thermal stresses and ensures that, even if the fuel plenums 220 and 222 are supplied separately or at different flow rates, there are no voids in the flame front that would otherwise be caused by a solid boundary wall between the fuel plenums 220 and 222.

Figure 12:
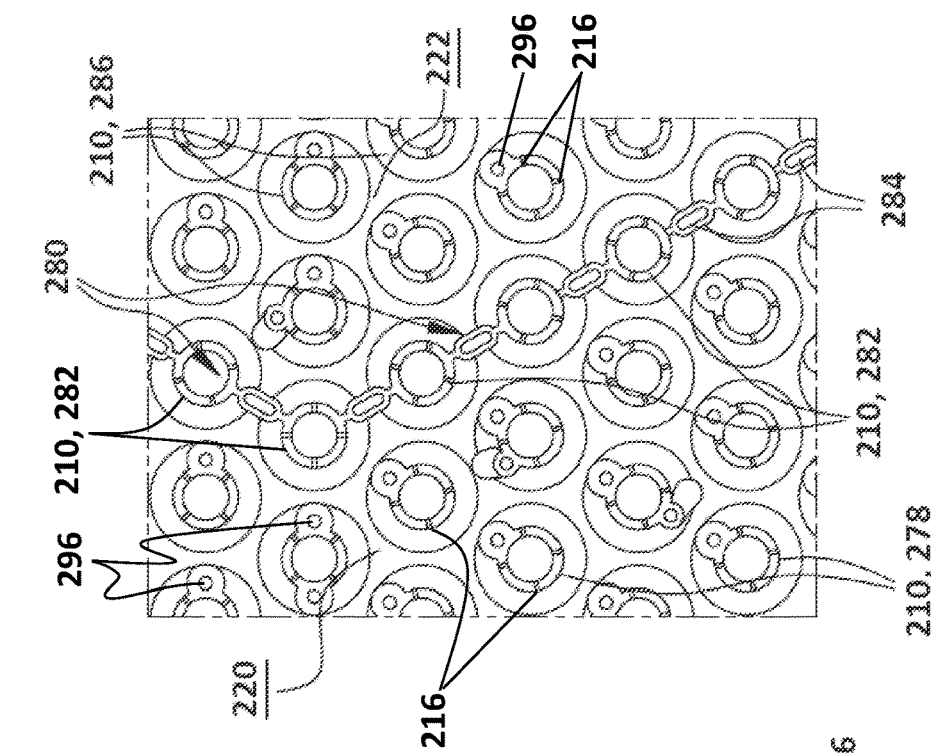
FIG. 12 is an enlarged cross-sectional view of a plurality of premixing tubes of the bundled tube fuel nozzle assembly, according to aspects of the present disclosure.
Figure 13:
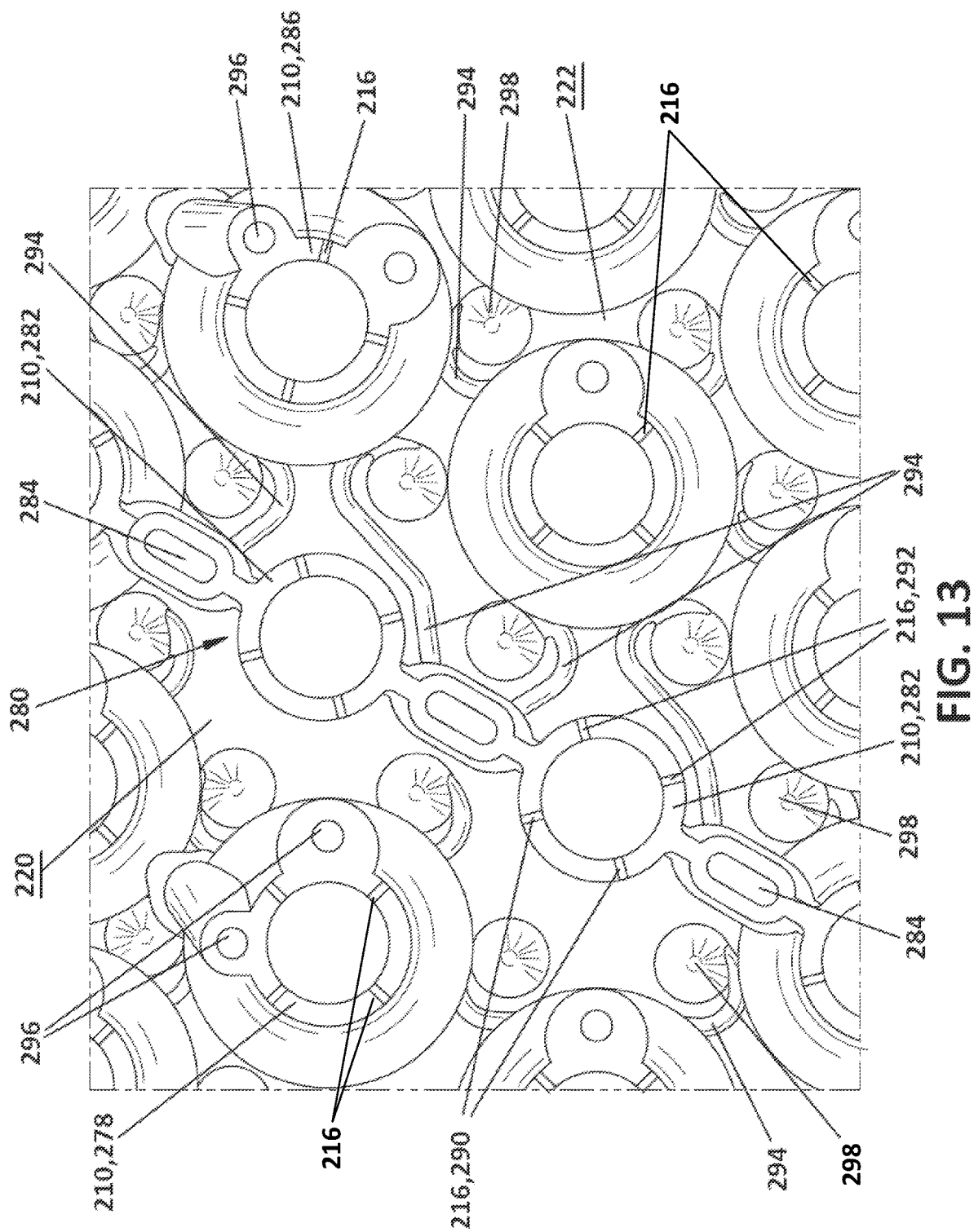
FIG. 13 is an enlarged cross-sectional view of a plurality of premixing tubes and cooling features of the bundled tube fuel nozzle assembly, according to aspects of the present disclosure.

As shown in FIGS. 12 and 13, at least one premixing tube of the plurality of premixing tubes 210, 278, 286 includes at least one air flow passage 296 integral with an exterior surface of the respective premixing tube 210, 278, 286 and extending from the forward plate 202 to the aft plate 204 of the bundled tube fuel nozzle assembly 200. Each respective air flow passage 296, which part of an integrated cooling system of the head end section 104, is in fluid communication with the head end air plenum 211 and the combustion chamber (e.g., primary combustion zone 120). More particularly, each of the respective air flow passages 296 has an inlet defined in the forward plate 202 and an outlet defined in the aft plate 204, and the outlet is fluidly coupled to at least one cooling channel 294 that is defined in the aft plate 204 and that extends among the respective outlets of neighboring premixing tubes 210, 278, 286 to provide convective cooling to the aft plate 204. To optimize the amount of cooling flow provided by the cooling channels 294, the inlet may be provided with a flow restriction (not shown). In various embodiments, the integrated cooling system includes one or two air flow passages 296 integral with the exterior surface of the respective premixing tube 210, 278, 286.

Each of the cooling channels 294 terminates in a swirl funnel 298, a conical structure that is in fluid communication with the combustion zone for delivering a swirling flow of air to the combustion zone. Specifically, each of the cooling channels 294 intersects the swirl funnel 298 in a tangential direction, thereby promoting a swirling flow as the air exits from the swirl funnel 298. In some embodiments, the swirl funnel 298 may include a lip that reduces the diameter of the opening of the swirl funnel 298, which accelerates the flow out of the swirl funnel 298. The introduction of small swirling streams between the non-swirling flows produced by the premixing tubes 210, 278, 282, 286 promotes combustion within the primary combustion zone 120. The swirl funnels 298 are included in the integrated cooling system of the head end section 104.

The bundled tube fuel nozzle assembly 200, as described above, is formed of an additively manufactured body in which the premixing tubes 210, 278, 282, 286 are integrally connected to the forward plate 202 and the aft plate 204. The premixing tubes 210, 278, 282, 286 each have a tube wall thickness, which is relatively thin when compared to a thickness of the forward plate 202. Other features, including the interior side wall 206, the exterior side wall 226, the plenum wall 224 (e.g., the corrugated plenum wall), the fuel inlets 232, 234, the partition 280, and the cooling features (e.g., the boundary air flow passages 284, the air flow passages 296, the convective cooling channels 294, and the swirl funnels 298) of the head end section integrated cooling system are built into the additively manufactured body.

It has been found that thermal stresses may arise in additively manufactured components having elements of different thicknesses. To spread out the transitions between the thickness of the forward plate 202 and the thicknesses of the walls of the respective premixing tubes 210, the forward plate 202 includes ridges 213 (FIGS. 5 and 7) projecting radially outwardly from the forward plate 202 in a honeycomb pattern between the premixing tubes 210 (e.g., between the premixing tubes 278 of the first plurality of premixing tubes). The inlet ends of the premixing tubes 210, 278, 282, 286 are concentric with concavities defined by the ridges 213 and are recessed relative to the ridges 213. Such a configuration (i.e., ridges, concavities, concentric arrangement) also helps to prevent the formation of steps in the interior surfaces of the premixing tubes 210, which might lead to flame holding concerns.

Additively manufacturing all the components together as a unitary body eliminates the need for multiple weld joints or braze joints between multiple small components and reduces the potential for leakage from the fuel plenums 220, 222, 230. Further, such an assembly eliminates seals between fuel nozzles in the head end section, provides greater engineering flexibility regarding placement of the premixing tubes, and avoids additional hardware to complete the assembly.

Figure 5:
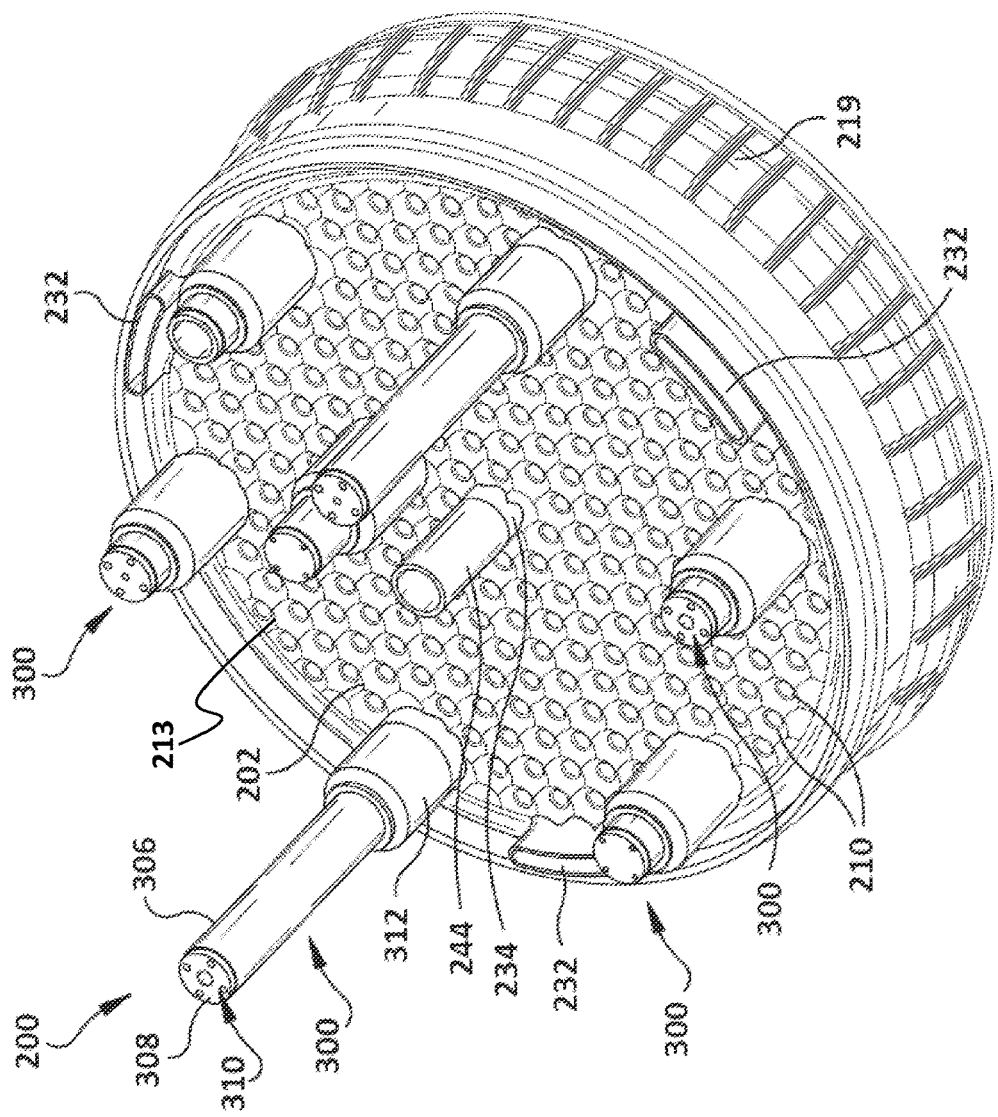
FIG. 5 is a perspective view of a forward side of a bundled tube fuel nozzle assembly and associated dampers, according to aspects of the present disclosure.

Other features that are additively manufactured with the bundled tube fuel nozzle assembly are the mounting bodies 302 (FIG. 7) of one or more quarter-wave tube dampers 300 (visible in FIGS. 5, 9, and 10). The mounting bodies 302 are integrally coupled to the aft plate 204, extend through the fuel plenum 220, 222, and terminate in an end upstream of the forward plate 202, where the term "upstream" is relative to the flow of air through the premixing tubes 210 and/or fluids through the combustion chamber. As seen most clearly in FIG. 5, an extended damper body 306 is welded to the damper mounting body 302 to create a quarter-wave tube damper of a desired length to mitigate dynamics of a particular frequency. The damper end 308 (of the extended damper body 306) has one or more apertures 310 to permit air flow through the damper 300. The damper end 308 is distal to the forward plate 202.

The damper mounting body 302 of each of the one or more quarter-wave tube dampers 300 is thermally decoupled from the interior side wall 206 to prevent distortion as might otherwise arise from the temperature difference between the cold fuel and the hot air flowing through the damper mounting body 302. The damper mounting body 302 is surrounded by a bellows mounting body 304 that projects from the forward plate 202 into the head end air plenum 111, as shown in FIG. 7. The bellows mounting body 304 extends a shorter distance from the forward plate 202 than the damper mounting body 302. An annular gap between the damper mounting body 302 and the bellows mounting body 304 may be used for powder removal after additive manufacturing of the bundled tube fuel nozzle assembly 200.

A bellows assembly 312 (shown in FIG. 5) is coupled to the bellows mounting body 304 of each of the one or more quarter-wave tube dampers 300 to prevent fuel from the fuel plenums 220, 222 from leaking into the head end plenum 111. The bellows assembly 312 includes a bellows with multiple convolutions and a thin shield protecting the bellows. The bellows assembly 312 may be coupled to the bellows mounting body 304 by welding. The segmented construction of the quarter-wave tube dampers 300 (e.g., with bellows assembly 312) enables significant reduction in stresses due to thermal growth of the quarter-wave tube dampers 300, which are distributed in different locations within the bundled tube fuel nozzle assembly 200. As a result, the likelihood of cracking in these locations is minimized, and component life and durability are improved.

As shown in FIG. 5, for example, the one or more quarter-wave tube dampers 300 comprise multiple quarter-wave tube dampers, and the multiple quarter-wave tube dampers 300 have extended damper bodies 306 of at least two different lengths to mitigate combustion dynamics of different frequencies. In the illustrated embodiment, seven quarter-wave tube dampers 300 are provided with damper bodies 306 of four different lengths. More or fewer dampers 300 may be used as part of a combustion dynamics mitigation system of the combustor 100. Alternately, the damper bodies 306 may have a uniform length, and inserts (not shown) of different lengths may be installed therein to achieve the desired dampening properties.

It is further contemplated that the damper mounting bodies 302, the bellows mounting bodies 304, and the bellows assemblies 312 may be used with one or more liquid fuel cartridges (not shown). In such cases, a liquid fuel cartridge would replace one or more of the extended damper bodies 306. For instance, three (every other) extended damper bodies 306 around the perimeter of the bundled tube fuel nozzle assembly 200 could be replaced with liquid fuel cartridges, which could be designed with a spray pattern that extends over roughly one-third of the aft plate 206 of the head end section 104. Additionally, or alternatively, the center damper mounting body 302 may be coupled to a pilot fuel nozzle, which may provide pilot fuel for starting on highly reactive fuels, such as hydrogen.

By way of example and not limitation, and as shown in FIGS. 3A and 3B, the dynamics mitigation system may also include resonators 320 and/or dampers 340. Resonators 320 may be provided within the head end plenum 111 (i.e., as "cold-side" dampers), and dampers 340 may be provided through the liner 106 and outer sleeves 122 and/or 124 (i.e., as "hot-side" dampers). Specifically, a plurality of resonators 320 may be disposed within the head end plenum 111, alone or in groups. Each resonator 320 has a resonator body defining a volume. The resonator body is closed on one end and has an open neck extending from the resonator body opposite the closed end. The neck, which has a smaller diameter than the closed end, is in fluid communication with the head end air plenum 111. In an exemplary embodiment, the plurality of resonators 320 includes one or more sets of at least one resonator 320 (for example, three sets of three resonators, each having a different volume). Each set is coupled to the upstream inner barrel 105 that partially surrounds the fuel conduits 402 that are coupled to the bundled tube fuel nozzle assembly 200.

One or more ("hot-side") dampers 340 may extend through a respective outer sleeve 122, 124 and through the liner 106, such that the damper volume is in fluid communication with the combustion chamber. Such dampers 340 are useful in mitigating mode shape dynamics experienced during different operating conditions of the combustor 100. In the exemplary embodiment, a first damper 340 is disposed forward of the first plurality of injectors 510, a second damper 340 is disposed between the first plurality of injectors 510 and the second plurality of injectors 550, and a third damper 340 is disposed aft of the second plurality of injectors 550. More or fewer dampers 340 may be used and may be positioned in various locations in fluid communication with the combustion chamber. The first damper 340, the second damper 340, and the third damper 340 may have two or more different damper volumes to dampen different combustion dynamics frequencies. Thus, the illustrated number and arrangement of dampers 340 should not be considered limiting of the present subject matter.

The combustor 100, its head end section 104, and its axial fuel staging system 500 are sized to be retrofit into the existing openings in a conventional 9F-class compressor discharge casing 17. The head end section 104 with its bundled tube fuel nozzle assembly 200 are discussed above. As shown in FIGS. 2, 3A, and 3B, the axial fuel staging system 500 includes a first plurality of injectors 510 disposed at a first axial location to direct a first fuel/air mixture through the liner 106 to a secondary combustion zone 512 and a second plurality of injectors 550 disposed at a second axial location downstream from the first plurality of injectors to direct a second fuel/air mixture through the liner 106 to a tertiary combustion zone 514. Each of the head end section 104 (e.g., the bundled tube fuel nozzle assembly 200), the first plurality of injectors 510, and the second plurality of injectors 550 receives a respective, discrete air supply from the compressor discharge plenum 19 that is defined by a compressor discharge casing 17 that at least partially surrounds the combustor 100. The respective air supplies are directed to only one of the head end section 104 (e.g., the bundled tube fuel nozzle assembly 200), the first plurality of injectors 510, and the second plurality of injectors 550.

The first plurality of injectors 510 and the second plurality of injectors 550 together receive more than 50% of the air supplies from the compressor discharge casing 17. A first air supply to the first plurality of injectors 510 is different in volume from a second air supply to the second plurality of injectors 550 and a third air supply to the head end section 104. The second plurality of injectors 550 receives a respective (second) air supply that is greater than the respective (third) air supply of the head end section 104 (e.g., the bundled tube fuel nozzle assembly 200) and that is greater than the respective (first) air supply of the first plurality of injectors 510. Additionally, in various preferred embodiments, a second air supply to the second plurality of injectors 550 is less than the sum of a first air supply to the first plurality of injectors 510 and a third air supply to the head end section 104.

The axial fuel staging system 500 includes a first plurality of injectors 510 and a second plurality of injectors 550. The first plurality of injectors 510 is disposed on a forward (upstream) portion of the liner 106, and the second plurality of injectors 550 is disposed on an aft (downstream) portion of the liner 106 that extends between the upstream portion and the aft frame 112. More specifically, as shown in FIG. 3A, the upstream portion of the liner 106 is defined between the aft face of the bundled tube fuel nozzle assembly 200 (or cap plate, if different fuel nozzles are used) and the first plurality of injectors 510 (i.e., immediately downstream of the first plurality of injectors 510), while the downstream portion of the liner 106 is defined between the upstream portion and the aft frame 112. In an exemplary embodiment, the first plurality of injectors 510 includes at least two injectors, and the second plurality of injectors 550 includes more than two injectors. In the illustrated embodiment, the first plurality of injectors 510 includes three injectors, and the second plurality of injectors 550 includes six injectors. In one exemplary embodiment, the injectors 510, 550 are identical to one another. In other embodiments, different injectors may be used between the first and second injection stages or within each injection stage.

Figure 14:
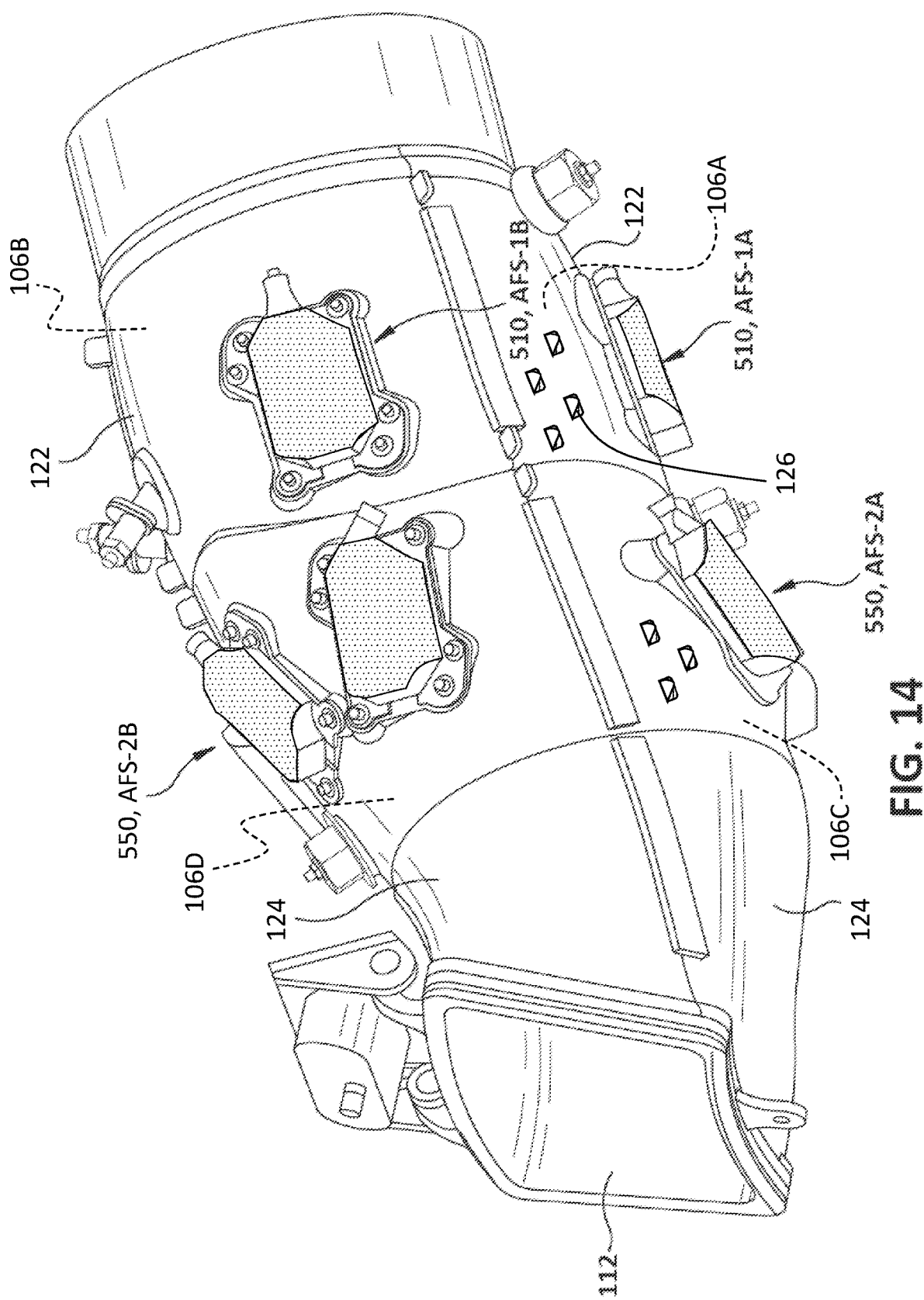
FIG. 14 is a side perspective view of the aft portion of the present combustor, showing the relative positions of a first plurality of fuel injectors and a second plurality of fuel injectors.

In one embodiment, as shown in FIG. 14, one injector of the first plurality of injectors 510 is disposed on a forward lower section (e.g., half) 106A of the liner 106, and two injectors of the first plurality of injectors 510 are disposed on a forward upper section (e.g., half) 106B of the liner 106, where the forward lower section 106A of the liner 106 is proximal to an axial centerline GT $C_L$ of the gas turbine engine 10 (FIG. 1), and the forward upper section 106B of the liner 106 is distal to the axial centerline GT $C_L$ of the gas turbine engine 10 (FIG. 1). In the illustrated embodiment, four injectors of the second plurality of injectors 550 are disposed on the aft upper section (e.g., half) 106C of the liner 106, and two injectors of the second plurality of injectors 550 are disposed on the aft lower section (e.g., half) 106D of the liner 106, where the aft upper section 106C of the liner 106 is distal to an axial centerline GT $C_L$ of the gas turbine engine 10 (FIG. 1), and the aft lower section 106D of the liner 106 is proximal to the axial centerline GT $C_L$ of the gas turbine engine 10 (FIG. 1). Said differently, injectors 510, 550 on the upper sections of the liner 106A, 106B are disposed on a radially outer section of the liner 106, while injectors 510, 550 on the lower sections of the liner 106A, 106B are disposed on a radially inner section of the liner 106.

The injectors 510 may be fueled collectively, via an "AFS-1" circuit. Alternately, a first subset of the injectors 510 may be coupled to a first fuel circuit (e.g., "AFS-1A"), and the remainder of the injectors 510 (a second subset) may be coupled to a second fuel circuit (e.g., "AFS-1B"). Each of the first subset and the second subset of the injectors 510 may include one or more injectors.

Similarly, the injectors 550 may be fueled collectively, via an "AFS-2" fuel circuit. Alternately, a third subset of the injectors 550 may be coupled to third fuel circuit ("AFS-2A"), and the remainder of the injectors 550 (a fourth subset) may be coupled to a fourth fuel circuit ("AFS-2B"). Each of the third subset and the fourth subset of the injectors 550 may include one or more injectors.

In one non-limiting embodiment illustrated in FIG. 14, the injector 510 on the forward lower section 106A of the liner 106 is considered the "AFS-1A" circuit, and the injectors 510 on the forward upper section 106B of the liner 106 are considered the "AFS-1B" circuit. The injectors 550 on the aft lower section 106C of the liner 106 are considered the "AFS-2A" circuit, and the injectors 550 on the aft upper section 106D of the liner 106 are considered the "AFS-2B" circuit.

In operation, the first plurality of injectors 510 and the second plurality of injectors 550 receive more than 50% of the airflow from the compressor discharge casing 17. The first plurality of injectors 510 is surrounded by the first impingement sleeve 122 having a first plurality of impingement openings. A first air supply from the compressor discharge plenum 17 is in fluid communication with the first plurality of injectors 510, via the first plurality of impingement openings, such that the respective first air supply experiences a first pressure drop from flowing through the first plurality of impingement openings. Similarly, the second plurality of injectors 550 is surrounded by the second impingement sleeve 124 having a second plurality of impingement openings. The second air supply from the compressor discharge plenum 17 is in fluid communication with the second plurality of injectors 550, via the second plurality of impingement openings, such that the second air supply experiences a second pressure drop from flowing through the second plurality of impingement openings. The second pressure drop is different from the first pressure drop.

As shown in FIGS. 2, 3A and 3B, each injector of the first plurality of injectors 510 and the second plurality of injectors 550 includes an injector body 515 having an elongated shape that is longer in an axial direction than in a transverse direction (e.g., a geometric stadium shape) and an injector fuel conduit 520 extending from the injector body 515 along an exterior surface of the outer sleeve 116 through the mounting flange 107. Each injector fuel conduit 520 comprises a straight portion 522 proximate to the mounting flange 107 and may include a curved portion 524 between the straight portion and the respective injector body 515. An arched conduit shield, or cover, 526 is removably mounted over the straight portion 522 by being bolted to the outer inlet flow conditioner 113 that is part of the head end section 104 of the combustor 100.

In various embodiments, the at least one injector of the first plurality of injectors 510 is oriented at a first angle relative to the combustor centerline, and the at least one injector of the second plurality of injectors 550 is oriented at a second angle relative to the combustor centerline, where the first angle and the second angle are different from one another. For example, the first angle may be about 10 degrees (±5 degrees), while the second angle may be about 30 degrees (±5 degrees). In some embodiments, the at least two injectors of the first plurality of injectors 510 are oriented at one or more first angles relative to a combustor centerline, which are different from the one or more second angles of the at least two injectors of the second plurality of injectors 550. In some embodiments, the at least two injectors of the second plurality of injectors 550 are oriented at different angles relative to the combustor centerline. For example, the aft ends of an adjacent pair of injectors of the second plurality of injectors may be oriented toward one another, as shown in FIGS. 3A and 14. The one or more first angles of the at least two injectors of the first plurality of injectors 510 and the one or more second angles of the at least two injectors of the second plurality of injectors 550 are configured to promote complete combustion and to optimize an exit temperature profile, an emissions profile, or both.

Figure 15:
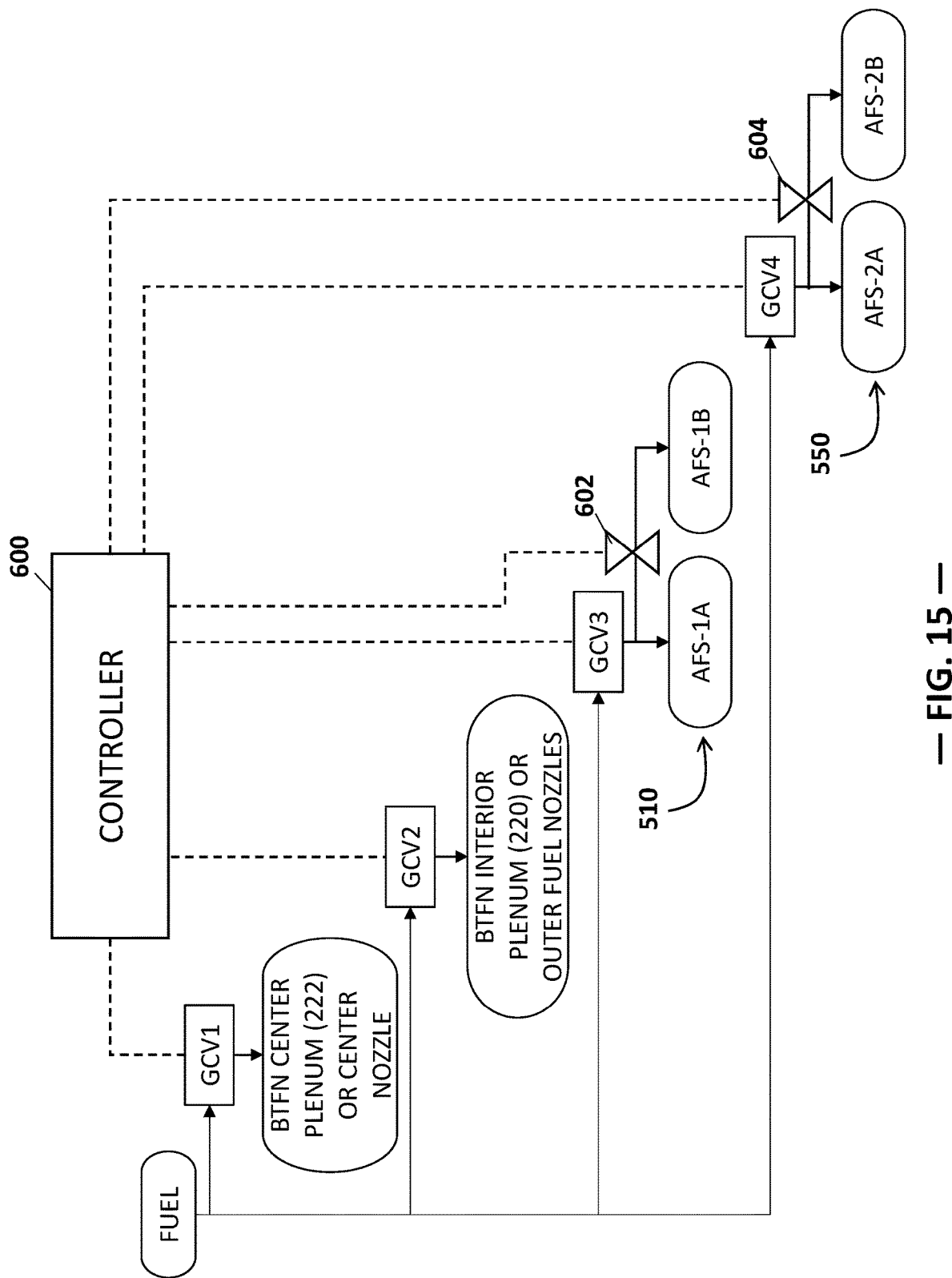
FIG. 15 is a schematic diagram depicting the fuel circuits associated with the present combustor, according to various aspects provided herein.

FIG. 15 is a schematic diagram of the controls of the fuel delivery for the combustor 100, as described herein. Fuel from a fuel supply is directed through a series of gas control valves (GCV1-GCV4) and optional discrete valves 602, 604 associated with a fuel circuit for a given combustor component or area. The control valves GCV1-GCV4 and the discrete valves 602, 604 are in electronic communication with a controller 600, as represented by dashed lines.

More specifically, the controller 600 controls GCV1 to adjust fuel flow to the center plenum 222 of the bundled tube fuel nozzle assembly ("BTFN") 200 (or, for example, to a center fuel nozzle of the head end section 104). The controller 600 controls GCV2 to adjust fuel flow to the interior plenum 220 of the bundled tube fuel nozzle assembly 200 (or, for example, to outer fuel nozzles positioned around the center nozzle of the head end section 104). The controller 600 controls GCV3 to adjust fuel flow to the first plurality of injectors 510 at the first axial distance from the head end portion 104. In embodiments in which the first plurality of injectors 510 includes a first subset of injectors and a second subset of injectors, the first subset of injectors may be fueled through an "AFS-1A" circuit, while the second subset of injectors may be fueled through an "AFS-1B" circuit. A discrete (on/off) valve 602 may be used to direct flow (or to stop flow) to the "AFS-1B" circuit. Similarly, in embodiments in which the second plurality of injectors 550 includes a first subset of injectors and second subset of injectors, the first subset of injectors may be fueled through an "AFS-2A" circuit, while the second subset of injectors may be fueled through an "AFS-2B" circuit. A discrete (on/off) valve 604 may be used to direct flow (or to stop flow) to the "AFS-2B" circuit.

Figure 16:
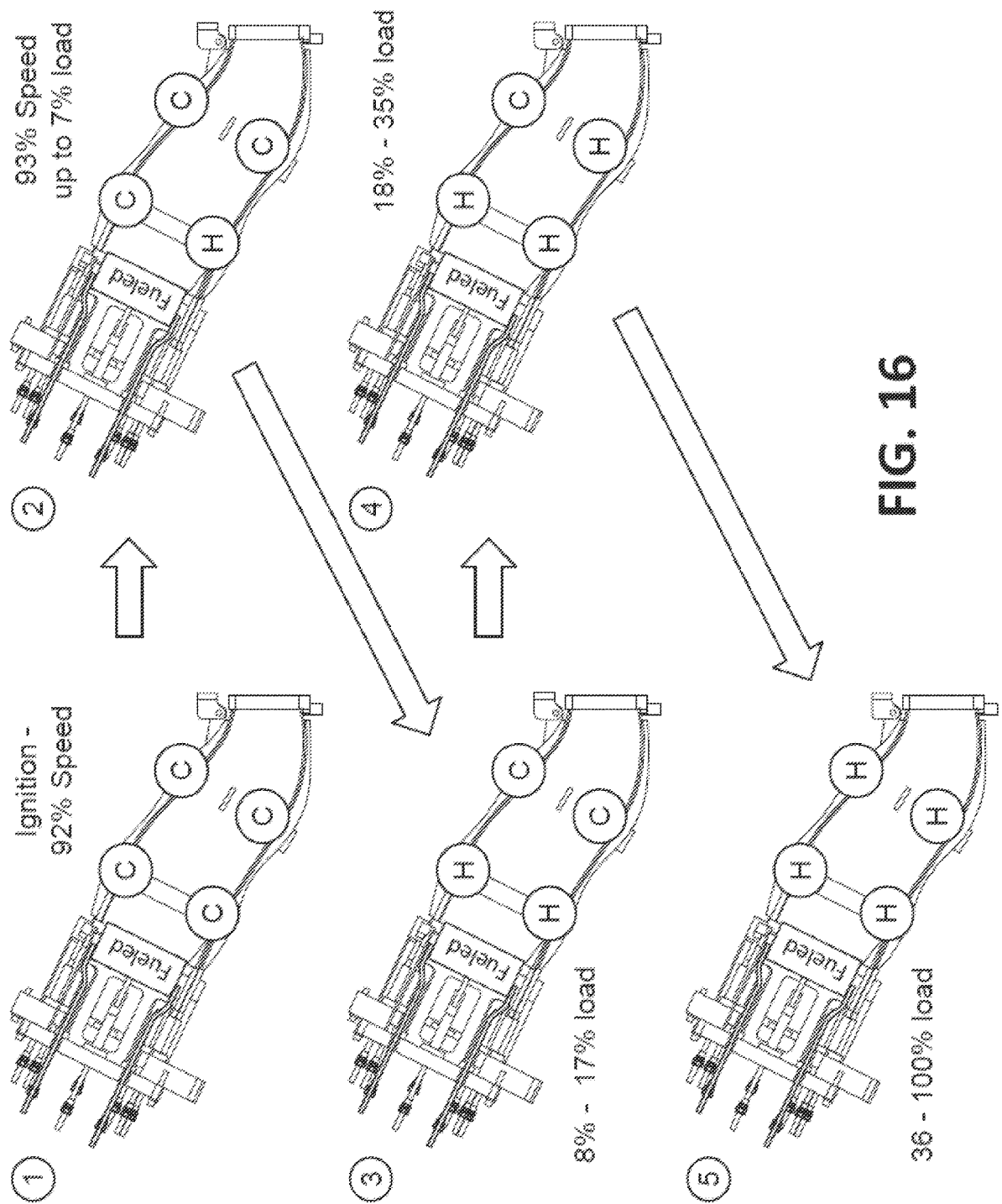
FIG. 16 is a series of images illustrating the various operating modes of the present combustor from ignition to full load, according to aspects of the present disclosure.
Figure 17:
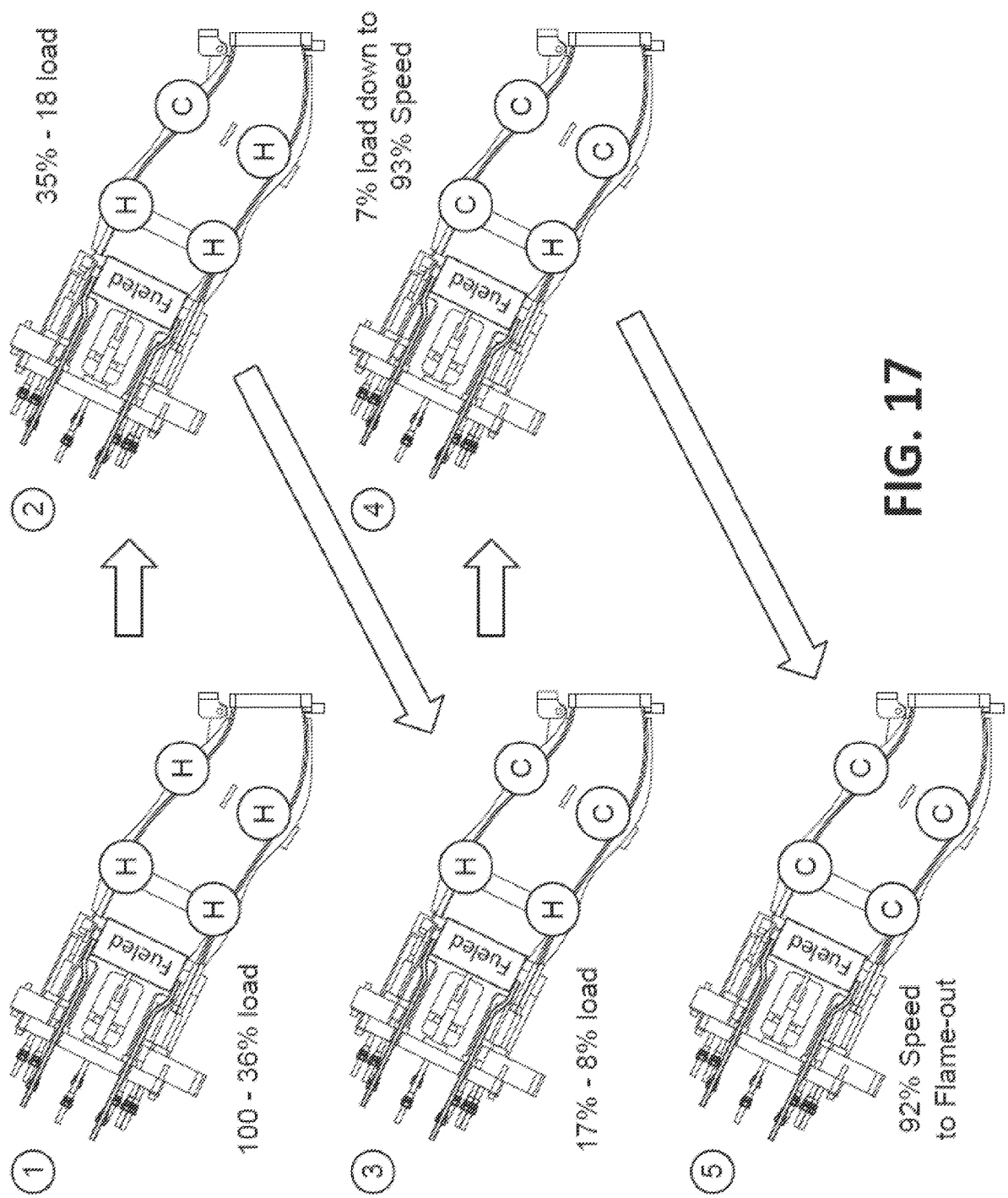
FIG. 17 is a series of images illustrating the various operating modes of the present combustor from full load to flameout, according to aspects of the present disclosure.

FIG. 16 provides a pictorial representation of the ramp-up of the gas turbine load from ignition to full speed, full load. FIG. 17 provides a pictorial representation of the turndown of the gas turbine engine from full speed, full load to flame-out (shut-down of the combustion system). In FIGS. 16 and 17, the fueled subsets are indicated with the letter "H" for "hot", while the unfueled subsets are indicated with the letter "C" for "cold." The load percentages referenced in the discussion of FIGS. 16 and 17 are representative based on the operating temperatures of the gas turbine combustor 100. Therefore, such load percentages should not be considered limiting.

As described herein, the present disclosure provides a method of operating a gas turbine combustor 100 having multiple axially spaced fuel stages. The method includes: selectively directing fuel and a first air supply through a fuel nozzle assembly (e.g., a bundled tube fuel nozzle assembly 200) in a head end section 104 of the gas turbine combustor 100 to produce a first fuel/air mixture and igniting the mixture within a liner 106 that defines a combustion chamber to produce combustion gases, the liner 106 extending downstream from the head end section 104 to an aft frame 112. The method further includes selectively directing a second fuel/air mixture through the liner 106 from at least one of a first plurality of injectors 210 disposed at a first axial location spaced from the head end section 104; and selectively directing a third fuel/air mixture through the liner 104 from at least one of a second plurality of injectors 550 disposed at a second axial location downstream from the first plurality of injectors 510. Each of the bundled tube fuel nozzle assembly 220, the first plurality of injectors 510, and the second plurality of injectors 550 receives a respective, discrete air supply from a compressor discharge plenum 19 that is defined by a compressor discharge casing 17 that at least partially surrounds the combustor 100. The respective air supplies are directed to only one of the bundled tube fuel nozzle assembly 200, the first plurality of injectors 510, and the second plurality of injectors 550. The second plurality of injectors 550 receives a respective air supply that is greater than the respective air supply of the bundled tube fuel nozzle assembly 200 and that is greater than the respective air supply of the first plurality of injectors 510.

The method step of selectively directing fuel and a first air supply through the head end section 104 containing the bundled tube fuel nozzle assembly 200 occurs in all combustion modes existing from ignition to full speed full load operation, as represented by the images in FIG. 16.

As described herein, the bundled tube fuel nozzle assembly 200 defines a center fuel plenum 222 and an interior fuel plenum 220 surrounding the center fuel plenum 222. The method step of selectively directing fuel and the first air supply through the head end section 104 containing the bundled tube fuel nozzle assembly 200 includes directing fuel through both the center fuel plenum 222 and the interior fuel plenum 220. In some embodiments, the center fuel plenum 222 and the interior fuel plenum 220 are supplied with fuel in such a manner to produce different fuel/air ratios between the center fuel plenum 222 and the interior fuel plenum 220.

As described above, the first plurality of injectors 510 comprises one or more injectors in a first subset (e.g., AFS-1A) and a remaining number of injectors of the first plurality of injectors in a second subset (e.g., AFS-1B). As shown in image 2 of FIG. 16, from about 93% of full speed up to about 7% load, the method step of selectively directing a second fuel/air mixture through the liner 106 from at least one of the first plurality of injectors 510 includes providing fuel to a first subset (e.g., AFS-1A) of the one or more injectors of the first plurality of injectors 510 and not providing fuel to the second subset (e.g., AFS-1B) of the remaining number of injectors of the first plurality of injectors 510.

In some embodiments, as shown in FIG. 14, the first subset (e.g., AFS-1A) of the first plurality of injectors 510 includes one or more injectors located on a forward lower section 106A of the liner 106, and the remaining number of injectors of the first plurality of injectors 510 in the second subset (e.g., AFS-1B) includes one or more injectors located on a forward upper section 106B of the liner 106.

When increasing load from about 8% load to about 17% load, as shown in image 3 of FIG. 16, the method step of selectively directing a second fuel/air mixture through the liner 106 from at least one of the first plurality of injectors 510 includes providing fuel to all of the one or more injectors of the first plurality of injectors 510.

As described above, the second plurality of injectors 550 includes one or more injectors in a third subset (e.g., AFS-2A) and a remaining number of injectors of the second plurality of injectors 550 in a fourth subset (e.g., AFS-2B). From ignition to about 18% load, as shown in images 1 through 3 of FIG. 16, the method step of selectively directing the third fuel/air mixture through the liner 106 from at least one of the second plurality of injectors 550 includes not providing fuel to the second plurality of injectors 550. Thus, as shown in image 3, the first plurality of injectors 510 are fueled (represented by letter "H"), and the second plurality of injectors 550 are unfueled (represented by letter "C").

As shown in image 4 of FIG. 16, from about 18% load to about 35% load, the method step of selectively directing a third fuel/air mixture through the liner 106 from at least one of the second plurality of injectors 550 includes providing fuel to the third subset (e.g., AFS-2A) of the one or more injectors and not providing fuel to the fourth subset (e.g., AFS-2B) of the remaining one or more injectors of the second plurality of injectors 550.

In some embodiments, as shown in FIG. 14, the third subset (e.g., AFS-2A) of the second plurality of injectors 550 includes one or more injectors located on an aft lower section 106C of the liner 106, and the remaining number of injectors of the fourth subset (e.g., AFS-2B) of the second plurality of injectors 550 includes one or more injectors located on an aft upper section 106D of the liner 106.

From about 36% load to full load, as shown in image 5 of FIG. 16, the method of selectively directing a second fuel/air mixture through the liner 106 from at least one of the first plurality of injectors 510 includes providing fuel to each injector of the first plurality of injectors 510, and selectively directing a third fuel/air mixture through the liner 106 from at least one of the second plurality of injectors 550 comprises providing fuel to each injector of the second plurality of injectors 550.

Turning now to FIG. 17, the method of operating the combustor 100 further includes turning down the gas turbine combustor, preferably in a manner to maintain emissions compliance. As shown in image 1 of FIG. 17, all circuits of the combustor 100 are fueled from 100% load to about 36% load. Fuel to the respective circuits can be reduced to unload the gas turbine until the gas turbine reaches about 36% load.

A mode transfer begins at about 35% load, and the method step of selectively directing a third fuel/air mixture through the liner 106 from at least one of the second plurality of injectors 550 includes ceasing the supply of fuel to the fourth subset (e.g., AFS-2B) of one or more injectors. As discussed above, the second plurality of injectors 550 includes a third subset of one or more injectors and a remaining number of injectors of the second plurality of injectors in a fourth subset. As shown in image 2 of FIG. 17, the gas turbine combustor 100 can continue to be unloaded from about 35% load to about 18% load, while the fuel is redistributed among the remaining active circuits (i.e., the circuits supplying the bundled tube fuel nozzle assembly, the AFS-1A injectors, the AFS-1B injectors, and the AFS-2A injectors).

As described, the third subset (e.g., AFS-2A) of the second plurality of injectors 550 includes one or more injectors located on an aft lower section 106C of the liner 106, and the remaining number of injectors of the fourth subset (e.g., AFS-2B) of the second plurality of injectors 550 includes one or more injectors located on an aft upper section 106D of the liner 106.

Another mode transfer begins at about 17% load, and the method step of selectively directing a third fuel/air mixture through the liner 106 from at least one of the second plurality of injectors 550 comprises ceasing the supply of fuel to each injector of the second plurality of injectors 550 by ceasing the supply of fuel to the third subset (e.g., AFS-2A) of the second plurality of injectors 550, as represented by image 3 of FIG. 17. As shown in image 3 of FIG. 17, the gas turbine combustor 100 can continue to be unloaded from about 17% load to about 8% load, while the fuel is redistributed among the remaining active circuits (i.e., the circuits supplying the bundled tube fuel nozzle assembly, the AFS-1A injectors, and the AFS-1B injectors).

As discussed above, the first plurality of injectors 510 may include a first subset (e.g., AFS-1A) of one or more injectors and a remaining number of injectors of the first plurality of injectors 510 in a second subset (e.g., AFS-1B). In some embodiments, the first subset (e.g., AFS-1A) of the first plurality of injectors 510 includes one or more injectors located on a forward lower section 106A of the liner 106, and the remaining number of injectors of the first plurality of injectors 510 in the second subset (e.g., AFS-1B) comprises one or more injectors located on a forward upper section 106B of the liner 106.

Another mode transfer begins at about 7% load, and the method step of selectively directing a second fuel/air mixture through the liner 106 from at least one of the first plurality of injectors 510 comprises ceasing the supply of fuel to the second subset (e.g., AFS-1B) of one or more injectors. As shown in image 4 of FIG. 17, the gas turbine combustor 100 can continue to be unloaded from about 7% load to about 93% speed, while the fuel is redistributed among the remaining active circuits (i.e., the circuits supplying the bundled tube fuel nozzle assembly and the AFS-1A injectors).

Another mode transfer begins at about 92% speed, and the method step of selectively directing a second fuel/air mixture through the liner 106 from at least one of the first plurality of injectors 510 comprises ceasing the supply of fuel to each injector of the first plurality of injectors 510. Thus, as shown in image 5, only the bundled tube fuel nozzle assembly 200 remains fueled, and the two subsets of each plurality of injectors 510, 550 are unfueled.

The method further comprises turning off the gas turbine combustor. When turning off the gas turbine combustor, the method step of selectively directing fuel and a first air supply through a bundled tube fuel nozzle assembly 200 in a head end section 104 of the gas turbine combustor 100 to produce a first fuel/air mixture includes reducing the supply of fuel to the bundled tube fuel nozzle assembly 200 until flame-out occurs.

To facilitate practice of the methods described herein, the gas turbine combustor 100 further comprises a controller 600 (FIG. 15) configured to selectively direct fuel to the bundled tube fuel nozzle assembly 200, the first plurality of injectors 510, and the second plurality of injectors 550.

Exemplary embodiments of combustion system, its various components, and its method of operation are described above in detail. The method, systems, and components described herein are not limited to the specific embodiments described herein, but rather, components of the method and systems may be utilized independently and separately from other components described herein. For example, the method and systems described herein may have other applications not limited to practice with turbine assemblies, as described herein. Rather, the method and systems described herein can be implemented and utilized in connection with various other industries.

While the claimed subject matter has been described in terms of various specific embodiments, those skilled in the art will recognize that the technology can be practiced with modification within the spirit and scope of the claims.

Exemplary clauses that can be used to describe the present combustor and its bundled tube fuel nozzle assembly are as follows. Any of the features in any of the clauses may be combined in any practical way to render still further embodiments.

According to a first aspect of the present disclosure, a method of operating a gas turbine combustor having multiple axially spaced fuel stages is provided, the method comprising: selectively directing fuel and a first air supply through a fuel nozzle assembly in a head end section of the gas turbine combustor to produce a first fuel/air mixture and igniting within a liner that defines a combustion chamber to produce combustion gases, the liner extending downstream from the head end section to an aft frame; selectively directing a second fuel/air mixture through the liner from at least one of a first plurality of injectors disposed at a first axial location spaced from the head end section; selectively directing a third fuel/air mixture through the liner from at least one of a second plurality of injectors disposed at a second axial location downstream from the first plurality of injectors; wherein each of the fuel nozzle assembly, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; and wherein the second plurality of injectors receives a respective air supply that is greater than each of the respective air supplies of the fuel nozzle assembly and the first plurality of injectors.

Another aspect of the present disclosure includes any of the preceding aspects, and wherein the step of selectively directing fuel and a first air supply through a head end section containing a fuel nozzle assembly occurs from ignition to full speed full load operation.

Another aspect of the present disclosure includes any of the preceding aspects, and wherein the fuel nozzle assembly is a bundled tube fuel nozzle assembly that comprises a center fuel plenum and an interior fuel plenum surrounding the center fuel plenum; and wherein the step of selectively directing fuel and the first air supply through the head end section containing the fuel nozzle assembly comprises directing fuel through both the center fuel plenum and the interior fuel plenum.

Another aspect of the present disclosure includes any of the preceding aspects, and wherein the center fuel plenum and the interior fuel plenum are supplied with fuel in such a manner to produce different fuel/air ratios between the center fuel plenum and the interior fuel plenum.

Another aspect of the present disclosure includes any of the preceding aspects, and wherein the first plurality of injectors comprises one or more injectors in a first subset and a remaining number of injectors of the first plurality of injectors in a second subset; and wherein, from about 93% of full speed no load operation up to about 8% load, the step of selectively directing a second fuel/air mixture through the liner from at least one of the first plurality of injectors comprises providing fuel to a first subset of the one or more injectors of the first plurality of injectors and not providing fuel to the second subset of the remaining number of injectors of the first plurality of injectors.

Another aspect of the present disclosure includes any of the preceding aspects, and wherein the first subset of the first plurality of injectors comprises one or more injectors located on a forward lower section of the liner, and the remaining number of injectors of the first plurality of injectors in the second subset comprises one or more injectors located on a forward upper section of the liner.

Another aspect of the present disclosure includes any of the preceding aspects, and wherein, from about 8% load to about 18% load, the step of selectively directing a second fuel/air mixture through the liner from at least one of the first plurality of injectors comprises providing fuel to all of the one or more injectors of the first plurality of injectors.

Another aspect of the present disclosure includes any of the preceding aspects, and wherein the second plurality of injectors comprises one or more injectors in a third subset and a remaining number of injectors of the second plurality of injectors in a fourth subset; and wherein, from ignition to about 18% load, the step of selectively directing the third fuel/air mixture through the liner from at least one of the second plurality of injectors comprises not providing fuel to the second plurality of injectors.

Another aspect of the present disclosure includes any of the preceding aspects, and wherein, from about 18% load to about 36% load, the step of selectively directing a third fuel/air mixture through the liner from at least one of the second plurality of injectors comprises providing fuel to the third subset of the one or more injectors and not providing fuel to the fourth subset of the remaining one or more injectors of the second plurality of injectors.

Another aspect of the present disclosure includes any of the preceding aspects, and wherein the third subset of the second plurality of injectors comprises one or more injectors located on an aft lower section of the liner, and the remaining number of injectors of the fourth subset of the second plurality of injectors comprises one or more injectors located on an aft upper section of the liner.

Another aspect of the present disclosure includes any of the preceding aspects, and wherein, from about 36% load to full load, the step of selectively directing a second fuel/air mixture through the liner from at least one of the first plurality of injectors comprises providing fuel to each injector of the first plurality of injectors; and the step of selectively directing a third fuel/air mixture through the liner from at least one of the second plurality of injectors comprises providing fuel to each injector of the second plurality of injectors.

Another aspect of the present disclosure includes any of the preceding aspects, and further comprising the step of turning down the gas turbine combustor; wherein the second plurality of injectors comprises a third subset of one or more injectors and a remaining number of injectors of the second plurality of injectors in a fourth subset; wherein, at about 35% load, the step of selectively directing a third fuel/air mixture through the liner from at least one of the second plurality of injectors includes ceasing the supply of fuel to the fourth subset of one or more injectors.

Another aspect of the present disclosure includes any of the preceding aspects, and wherein the third subset of the second plurality of injectors comprises one or more injectors located on an aft lower section of the liner, and the remaining number of injectors of the fourth subset of the second plurality of injectors comprises one or more injectors located on an aft upper section of the liner.

Another aspect of the present disclosure includes any of the preceding aspects, and further comprising turning down the gas turbine combustor; wherein, at about 17% load, the step of selectively directing a third fuel/air mixture through the liner from at least one of the second plurality of injectors comprises ceasing the supply of fuel to each injector of the second plurality of injectors by ceasing the supply of fuel to the third subset of the second plurality of injectors.

Another aspect of the present disclosure includes any of the preceding aspects, and further comprising turning down the gas turbine combustor; wherein the first plurality of injectors comprises a first subset of one or more injectors and a remaining number of injectors of the first plurality of injectors in a second subset; wherein, at about 7% load, the step of selectively directing a second fuel/air mixture through the liner from at least one of the first plurality of injectors comprises ceasing the supply of fuel to the second subset of one or more injectors.

Another aspect of the present disclosure includes any of the preceding aspects, and wherein the first subset of the first plurality of injectors comprises one or more injectors located on a forward lower section of the liner, and the remaining number of injectors of the first plurality of injectors in the second subset comprises one or more injectors located on a forward upper section of the liner.

Another aspect of the present disclosure includes any of the preceding aspects, and further comprising turning down the gas turbine combustor; wherein, at about 92% speed, the step of selectively directing a second fuel/air mixture through the liner from at least one of the first plurality of injectors comprises ceasing the supply of fuel to each injector of the first plurality of injectors by ceasing the supply of fuel to the first subset of one or more injectors.

Another aspect of the present disclosure includes any of the preceding aspects, and further comprising turning off the gas turbine combustor; wherein, when turning off the gas turbine combustor, the step of selectively directing fuel and a first air supply through a bundled tube fuel nozzle assembly in a head end section of the gas turbine combustor to produce a first fuel/air mixture comprises reducing the supply of fuel to the bundled tube fuel nozzle assembly until a flame-out occurs.

Another aspect of the present disclosure includes any of the preceding aspects, and wherein the gas turbine combustor further comprises a controller configured to selectively direct fuel to the bundled tube fuel nozzle assembly, the first plurality of injectors, and the second plurality of injectors.

What is claimed is:

1. A method of operating a gas turbine combustor having multiple axially spaced fuel stages, the method comprising:
   selectively directing fuel and a first air supply through a fuel nozzle assembly in a head end section of the gas turbine combustor to produce a first fuel/air mixture and igniting within a liner that defines a combustion chamber to produce combustion gases, the liner extending downstream from the head end section to an aft frame;
   selectively directing a second fuel/air mixture through the liner from at least one of a first plurality of injectors disposed at a first axial location spaced from the head end section;
   selectively directing a third fuel/air mixture through the liner from at least one of a second plurality of injectors disposed at a second axial location downstream from the first plurality of injectors; wherein each of the fuel nozzle assembly, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; wherein the second plurality of injectors receives a respective air supply that is greater than each of the respective air supplies of the fuel nozzle assembly and the first plurality of injectors; and wherein, from ignition to about 18% load, the step of selectively directing the third fuel/air mixture through the liner from at least one of the second plurality of injectors comprises not providing fuel to the second plurality of injectors.

2. The method of claim 1, wherein the step of selectively directing fuel and a first air supply through a head end section containing a fuel nozzle assembly occurs from ignition to full speed full load operation.

3. The method of claim 2, wherein the first plurality of injectors comprises one or more injectors in a first subset and a remaining number of injectors of the first plurality of injectors in a second subset; and wherein, from about 93% of full speed no load operation up to about 8% load, the step of selectively directing a second fuel/air mixture through the liner from at least one of the first plurality of injectors comprises providing fuel to a first subset of the one or more injectors of the first plurality of injectors and not providing fuel to the second subset of the remaining number of injectors of the first plurality of injectors.

4. The method of claim 3, wherein the first subset of the first plurality of injectors comprises one or more injectors located on a forward lower section of the liner, and the remaining number of injectors of the first plurality of injectors in the second subset comprises one or more injectors located on a forward upper section of the liner.

5. The method of claim 3, wherein, from about 8% load to about 18% load, the step of selectively directing a second fuel/air mixture through the liner from at least one of the first plurality of injectors comprises providing fuel to all of the one or more injectors of the first plurality of injectors.

6. The method of claim 2, wherein, from about 36% load to full load, the step of selectively directing a second fuel/air mixture through the liner from at least one of the first plurality of injectors comprises providing fuel to each injector of the first plurality of injectors; and the step of selectively directing a third fuel/air mixture through the liner from at least one of the second plurality of injectors comprises providing fuel to each injector of the second plurality of injectors.

7. The method of claim 1, wherein the second plurality of injectors comprises one or more injectors in a third subset and a remaining number of injectors of the second plurality of injectors in a fourth subset; wherein, from about 18% load to about 36% load, the step of selectively directing a third fuel/air mixture through the liner from at least one of the second plurality of injectors comprises providing fuel to the third subset of the one or more injectors and not providing fuel to the fourth subset of the remaining one or more injectors of the second plurality of injectors.

8. The method of claim 7, wherein the third subset of the second plurality of injectors comprises one or more injectors located on an aft lower section of the liner, and the remaining number of injectors of the fourth subset of the second plurality of injectors comprises one or more injectors located on an aft upper section of the liner.

9. The method of claim 1, wherein the gas turbine combustor further comprises a controller configured to selectively direct fuel to the fuel nozzle assembly, the first plurality of injectors, and the second plurality of injectors.

10. The method of claim 2, wherein the fuel nozzle assembly is a bundled tube fuel nozzle assembly that comprises a center fuel plenum and an interior fuel plenum surrounding the center fuel plenum; and wherein the step of selectively directing fuel and the first air supply through the head end section containing the fuel nozzle assembly comprises directing fuel through both the center fuel plenum and the interior fuel plenum.

11. The method of claim 10, wherein the center fuel plenum and the interior fuel plenum are supplied with fuel in such a manner to produce different fuel/air ratios between the center fuel plenum and the interior fuel plenum.

12. A method of operating a gas turbine combustor having multiple axially spaced fuel stages, the method comprising:
selectively directing fuel and a first air supply through a fuel nozzle assembly in a head end section of the gas turbine combustor to produce a first fuel/air mixture and igniting within a liner that defines a combustion chamber to produce combustion gases, the liner extending downstream from the head end section to an aft frame;
selectively directing a second fuel/air mixture through the liner from at least one of a first plurality of injectors disposed at a first axial location spaced from the head end section;
selectively directing a third fuel/air mixture through the liner from at least one of a second plurality of injectors disposed at a second axial location downstream from the first plurality of injectors; wherein each of the fuel nozzle assembly, the first plurality of injectors, and the second plurality of injectors receives a respective air supply from a compressor discharge plenum that is defined by a compressor discharge casing that at least partially surrounds the combustor, the respective air supplies being directed to only one of the fuel nozzle assembly, the first plurality of injectors, and the second plurality of injectors; and wherein the second plurality of injectors receives a respective air supply that is greater than each of the respective air supplies of the fuel nozzle assembly and the first plurality of injectors; and
turning down the gas turbine combustor; wherein the second plurality of injectors comprises a third subset of one or more injectors and a remaining number of injectors of the second plurality of injectors in a fourth subset; wherein, at about 35% load, the step of selectively directing a third fuel/air mixture through the liner from at least one of the second plurality of injectors includes ceasing the supply of fuel to the fourth subset of one or more injectors.

13. The method of claim 12, wherein the third subset of the second plurality of injectors comprises one or more injectors located on an aft lower section of the liner, and the remaining number of injectors of the fourth subset of the second plurality of injectors comprises one or more injectors located on an aft upper section of the liner.

14. The method of claim 12, further comprising turning down the gas turbine combustor; wherein, at about 17% load, the step of selectively directing a third fuel/air mixture through the liner from at least one of the second plurality of injectors comprises ceasing the supply of fuel to each injector of the second plurality of injectors by ceasing the supply of fuel to the third subset of the second plurality of injectors.

15. The method of claim 14, further comprising turning down the gas turbine combustor; wherein the first plurality of injectors comprises a first subset of one or more injectors and a remaining number of injectors of the first plurality of injectors in a second subset; wherein, at about 7% load, the step of selectively directing a second fuel/air mixture through the liner from at least one of the first plurality of injectors comprises ceasing the supply of fuel to the second subset of one or more injectors.

16. The method of claim 15, wherein the first subset of the first plurality of injectors comprises one or more injectors located on a forward lower section of the liner, and the remaining number of injectors of the first plurality of injectors in the second subset comprises one or more injectors located on a forward upper section of the liner.

17. The method of claim 15, further comprising turning down the gas turbine combustor; wherein, at about 92% speed, the step of selectively directing a second fuel/air mixture through the liner from at least one of the first plurality of injectors comprises ceasing the supply of fuel to each injector of the first plurality of injectors by ceasing the supply of fuel to the first subset of one or more injectors.

18. The method of claim 12, further comprising turning off the gas turbine combustor; wherein, when turning off the gas turbine combustor, the step of selectively directing fuel and a first air supply through the fuel nozzle assembly in the head end section of the gas turbine combustor to produce a first fuel/air mixture comprises reducing the supply of fuel to the fuel nozzle assembly until a flame-out occurs.

* * * * *